United States Patent
Wang et al.

(10) Patent No.: US 12,262,418 B2
(45) Date of Patent: Mar. 25, 2025

(54) UPLINK TIMING ADVANCE ESTIMATION FROM SIDELINK

(71) Applicant: QUALCOMM Incorporated, San Diego, CA (US)

(72) Inventors: Hua Wang, Basking Ridge, NJ (US); Sony Akkarakaran, Poway, CA (US); Tao Luo, San Diego, CA (US); Junyi Li, Fairless Hills, PA (US); Jung Ho Ryu, Fort Lee, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 427 days.

(21) Appl. No.: 17/568,633

(22) Filed: Jan. 4, 2022

(65) Prior Publication Data

US 2023/0217497 A1 Jul. 6, 2023

(51) Int. Cl.
| | | |
|---|---|---|
| *H04W 74/08* | (2024.01) | |
| *H04W 74/00* | (2009.01) | |
| *H04W 74/0833* | (2024.01) | |
| *H04W 56/00* | (2009.01) | |
| *H04W 92/18* | (2009.01) | |

(52) U.S. Cl.
CPC ..... *H04W 74/0833* (2013.01); *H04W 74/004* (2013.01); *H04W 74/006* (2013.01); *H04W 56/001* (2013.01); *H04W 92/18* (2013.01)

(58) Field of Classification Search
CPC .......... H04W 74/0833; H04W 74/004; H04W 74/006; H04W 56/001; H04W 92/18; H04W 56/0005; H04W 56/0045
See application file for complete search history.

(56) References Cited

U.S. PATENT DOCUMENTS

| | | | | |
|---|---|---|---|---|
| 10,517,081 B2 * | 12/2019 | Frenne | ................ | H04W 72/23 |
| 11,358,613 B2 * | 6/2022 | Hur | ........................ | H04W 4/44 |
| 11,382,098 B2 * | 7/2022 | Li | ..................... | H04W 56/0005 |
| 11,470,452 B2 * | 10/2022 | Ganesan | ............... | H04L 1/1825 |
| 11,985,618 B2 * | 5/2024 | Narasimha | ........ | H04W 56/0005 |
| 12,052,621 B2 * | 7/2024 | Cui | .................. | H04W 56/0045 |
| 2014/0079033 A1 * | 3/2014 | Bergstrom | ............ | H04L 5/0078 |
| | | | | 370/336 |
| 2017/0041841 A1 * | 2/2017 | Pedersen | ............... | H04W 36/08 |
| 2019/0021031 A1 * | 1/2019 | Pedersen | ............... | H04W 36/08 |
| 2020/0260231 A1 * | 8/2020 | Ganesan | ............... | H04W 16/28 |
| 2020/0396734 A1 | 12/2020 | Li et al. | | |
| 2020/0404598 A1 * | 12/2020 | Landis | .................. | H04W 24/08 |

(Continued)

FOREIGN PATENT DOCUMENTS

| | | | | | |
|---|---|---|---|---|---|
| CN | 113412670 A | * | 9/2021 | ....... | H04L 27/26025 |
| CN | 114390715 A | * | 4/2022 | ............ | H04B 7/185 |

(Continued)

*Primary Examiner* — Jay P Patel

(74) *Attorney, Agent, or Firm* — Holland & Hart LLP

(57) ABSTRACT

Methods, systems, and devices for wireless communication are described. A first user equipment (UE) may receive, from a second UE, an indication of a first uplink timing advance for communications from the second UE to a base station. The UE may estimate, based at least in part on the first uplink timing advance received from the second UE, a second uplink timing advance for transmission of a random access message from the first UE to the base station. The UE may transmit, to the base station, the random access message using the second uplink timing advance.

28 Claims, 17 Drawing Sheets

(56) References Cited

U.S. PATENT DOCUMENTS

| | | | |
|---|---|---|---|
| 2021/0022180 A1* | 1/2021 | Lei | H04L 5/10 |
| 2021/0051619 A1* | 2/2021 | Gulati | H04W 56/005 |
| 2021/0227620 A1* | 7/2021 | Pan | H04W 4/40 |
| 2021/0227621 A1* | 7/2021 | Pan | H04W 72/02 |
| 2021/0331701 A1* | 10/2021 | Hur | H04W 4/44 |
| 2022/0061003 A1* | 2/2022 | Wang | H04W 56/001 |
| 2022/0124795 A1* | 4/2022 | Wu | H04B 7/18563 |
| 2022/0240206 A1* | 7/2022 | Bao | G01S 13/878 |
| 2022/0256357 A1* | 8/2022 | Kim | H04W 72/12 |
| 2022/0361168 A1* | 11/2022 | Lim | H04L 27/26025 |
| 2022/0394648 A1* | 12/2022 | Lin | H04W 56/0045 |
| 2023/0068762 A1* | 3/2023 | Lin | H04W 56/0045 |
| 2023/0100539 A1* | 3/2023 | Saha | H04B 7/0695 370/329 |
| 2023/0115591 A1* | 4/2023 | Yamine | H04W 36/32 370/331 |
| 2023/0116853 A1* | 4/2023 | Ji | H04W 72/121 370/336 |
| 2023/0133633 A1* | 5/2023 | Park | H04W 56/0045 370/331 |
| 2024/0089763 A1* | 3/2024 | Wu | H04W 24/08 |

FOREIGN PATENT DOCUMENTS

| | | | | |
|---|---|---|---|---|
| EP | 3391698 B1 | * | 2/2021 | H04W 72/04 |
| EP | 3907902 A1 | * | 11/2021 | H04B 7/18504 |
| WO | WO-2018175407 A1 | * | 9/2018 | H04B 17/11 |
| WO | WO-2020060467 A1 | * | 3/2020 | H04W 74/0833 |
| WO | WO-2020145248 A1 | * | 7/2020 | H04W 36/08 |
| WO | WO-2020251734 A1 | * | 12/2020 | H04W 56/0005 |
| WO | WO-2021076029 A1 | * | 4/2021 | |
| WO | WO-2021144028 A1 | * | 7/2021 | |
| WO | WO-2021156646 A1 | * | 8/2021 | H04B 7/18504 |
| WO | WO-2021235986 A1 | * | 11/2021 | H04W 36/0058 |
| WO | WO-2023081552 A1 | * | 5/2023 | H04W 36/0072 |

* cited by examiner

UPLINK TIMING ADVANCE ESTIMATION FROM SIDELINK

FIELD OF TECHNOLOGY

The following relates to wireless communication, including uplink timing advance estimation from sidelink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support uplink timing advance estimation from sidelink. Generally, aspects of the techniques described herein provide various mechanisms where a user equipment (UE) (e.g., a UE attempting to establish a connection with a base station via a random access channel (RACH) procedure) without an uplink timing advance value utilizes another UE's timing advance value to estimate its own uplink timing advance for use in the RACH communications with a base station. For example, the RACH UE may receive, via sidelink communications with another UE, an indication of an uplink timing advance of the sidelink UE (e.g., any other UE that the RACH UE has a sidelink connection with). The RACH UE may estimate its uplink timing advance to use for a RACH message transmission to the base station. For example, the RACH UE may use the uplink timing advance of the sidelink UE in combination with the location of the sidelink UE, distance of the sidelink UE from the RACH UE and/or base station, and the like, to identify, measure, or otherwise estimate its own uplink timing advance for the base station. The RACH UE may transmit the random access message (e.g., the RACH message A (MsgA)) to the base station using its own, estimated uplink timing advance.

A method for wireless communication at a first UE is described. The method may include receiving, from a second UE, an indication of a first uplink timing advance for communications from the second UE to a base station, estimating, based on the first uplink timing advance received from the second UE, a second uplink timing advance for transmission of a random access message from the first UE to the base station, and transmitting, to the base station, the random access message using the second uplink timing advance.

An apparatus for wireless communication at a first UE is described. The apparatus may include a processor, memory coupled with the processor, and instructions stored in the memory. The instructions may be executable by the processor to cause the apparatus to receive, from a second UE, an indication of a first uplink timing advance for communications from the second UE to a base station, estimate, based on the first uplink timing advance received from the second UE, a second uplink timing advance for transmission of a random access message from the first UE to the base station, and transmit, to the base station, the random access message using the second uplink timing advance.

Another apparatus for wireless communication at a first UE is described. The apparatus may include means for receiving, from a second UE, an indication of a first uplink timing advance for communications from the second UE to a base station, means for estimating, based on the first uplink timing advance received from the second UE, a second uplink timing advance for transmission of a random access message from the first UE to the base station, and means for transmitting, to the base station, the random access message using the second uplink timing advance.

A non-transitory computer-readable medium storing code for wireless communication at a first UE is described. The code may include instructions executable by a processor to receive, from a second UE, an indication of a first uplink timing advance for communications from the second UE to a base station, estimate, based on the first uplink timing advance received from the second UE, a second uplink timing advance for transmission of a random access message from the first UE to the base station, and transmit, to the base station, the random access message using the second uplink timing advance.

In some examples of the method, apparatuses, and non-transitory computer-readable medium described herein, estimating the second uplink timing advance may include operations, features, means, or instructions for determining a distance between the first UE and the second UE, comparing the distance with a distance threshold, and estimating the second uplink timing advance based on the comparing of the distance with the distance threshold.

In some examples of the method, apparatuses, and non-transitory computer-readable medium described herein, determining the distance may include operations, features, means, or instructions for receiving an indication of the distance threshold from the base station, the second UE, or both.

Some examples of the method, apparatuses, and non-transitory computer-readable medium described herein may further include operations, features, means, or instructions for adjusting the distance threshold based on the first uplink timing advance.

Some examples of the method, apparatuses, and non-transitory computer-readable medium described herein may further include operations, features, means, or instructions for adjusting the distance threshold based on a comparison of a first receive beam of the first UE and a second receive beam of the second UE, where the first receive beam and the second receive beam may be used by the first UE and the second UE, respectively, for receiving synchronization signal blocks from the base station.

In some examples of the method, apparatuses, and non-transitory computer-readable medium described herein, determining the distance may include operations, features, means, or instructions for performing a ranging procedure for the second UE based on a sidelink connection between the first UE and the second UE.

Some examples of the method, apparatuses, and non-transitory computer-readable medium described herein may further include operations, features, means, or instructions for selecting between a four-step random access procedure and a two-step random access procedure based on a comparison of the second uplink timing advance with a timing advance threshold, where in the random access message may be a first uplink random access message in either the four-step random access procedure or the two-step random access procedure.

Some examples of the method, apparatuses, and non-transitory computer-readable medium described herein may further include operations, features, means, or instructions for receiving a radio resource control (RRC) configuration message from the base station indicating the timing advance threshold, where the timing advance threshold includes an estimated timing advance valid time offset, a reference signal received power (RSRP) threshold with timing advance, a RSRP threshold without timing advance, or any combination thereof.

Some examples of the method, apparatuses, and non-transitory computer-readable medium described herein may further include operations, features, means, or instructions for comparing an estimation time for the second uplink timing advance to a transmit time of the random access message according to the estimated timing advance valid time offset and selecting the two-step random access procedure based on the estimation time for the second uplink timing advance being within the estimated timing advance time offset.

Some examples of the method, apparatuses, and non-transitory computer-readable medium described herein may further include operations, features, means, or instructions for selecting the two-step random access procedure based on comparing a measured RSRP value for a channel between the first UE and the base station to the RSRP threshold with timing advance.

Some examples of the method, apparatuses, and non-transitory computer-readable medium described herein may further include operations, features, means, or instructions for transmitting, via a sidelink connection between the first UE and the second UE, a message to the second UE requesting the indication of the first uplink timing advance, where the indication of the first uplink timing advance may be received based on the message.

In some examples of the method, apparatuses, and non-transitory computer-readable medium described herein, the message includes a sidelink medium access control-control element (MAC-CE) message, a sidelink RRC message, or any combination thereof.

In some examples of the method, apparatuses, and non-transitory computer-readable medium described herein, the indication of the first uplink timing advance may be received via a sidelink MAC-CE message, a sidelink RRC message, or any combination thereof.

In some examples of the method, apparatuses, and non-transitory computer-readable medium described herein, the second uplink timing advance may be the same as the first uplink timing advance.

A method for wireless communication at a first UE is described. The method may include determining an uplink timing advance for a channel between the first UE and a base station serving the first UE and transmitting an indication of the first uplink timing advance to a second UE.

An apparatus for wireless communication at a first UE is described. The apparatus may include a processor, memory coupled with the processor, and instructions stored in the memory. The instructions may be executable by the processor to cause the apparatus to determine an uplink timing advance for a channel between the first UE and a base station serving the first UE and transmit an indication of the first uplink timing advance to a second UE.

Another apparatus for wireless communication at a first UE is described. The apparatus may include means for determining an uplink timing advance for a channel between the first UE and a base station serving the first UE and means for transmitting an indication of the first uplink timing advance to a second UE.

A non-transitory computer-readable medium storing code for wireless communication at a first UE is described. The code may include instructions executable by a processor to determine an uplink timing advance for a channel between the first UE and a base station serving the first UE and transmit an indication of the first uplink timing advance to a second UE.

Some examples of the method, apparatuses, and non-transitory computer-readable medium described herein may further include operations, features, means, or instructions for receiving, via a sidelink connection between the first UE and a second UE, a message from the second UE requesting an indication of the first uplink timing advance of the first UE, where the indication of the first uplink timing advance may be transmitted based on the message.

Some examples of the method, apparatuses, and non-transitory computer-readable medium described herein may further include operations, features, means, or instructions for broadcasting the indication of the first uplink timing advance via a sidelink connection between the first UE and the second UE.

Some examples of the method, apparatuses, and non-transitory computer-readable medium described herein may further include operations, features, means, or instructions for determining a location of the first UE and transmitting an indication of the location of the first UE to the second UE.

A method for wireless communication at a base station is described. The method may include transmitting, to a UE, a configuration message indicating a timing advance threshold, where the timing advance threshold includes an estimated timing advance valid time offset, a RSRP threshold with timing advance, a RSRP threshold without timing advance, or any combination thereof and receiving a random access message from the UE based on the configuration message and an uplink timing advance estimated by the UE using the timing advance threshold.

An apparatus for wireless communication at a base station is described. The apparatus may include a processor, memory coupled with the processor, and instructions stored in the memory. The instructions may be executable by the processor to cause the apparatus to transmit, to a UE, a configuration message indicating a timing advance threshold, where the timing advance threshold includes an estimated timing advance valid time offset, a RSRP threshold with timing advance, a RSRP threshold without timing advance, or any combination thereof and receive a random access message from the UE based on the configuration message and an uplink timing advance estimated by the UE using the timing advance threshold.

Another apparatus for wireless communication at a base station is described. The apparatus may include means for transmitting, to a UE, a configuration message indicating a timing advance threshold, where the timing advance threshold includes an estimated timing advance valid time offset, a RSRP threshold with timing advance, a RSRP threshold without timing advance, or any combination thereof and means for receiving a random access message from the UE based on the configuration message and an uplink timing advance estimated by the UE using the timing advance threshold.

A non-transitory computer-readable medium storing code for wireless communication at a base station is described. The code may include instructions executable by a processor to transmit, to a UE, a configuration message indicating a timing advance threshold, where the timing advance threshold includes an estimated timing advance valid time offset, a RSRP threshold with timing advance, a RSRP threshold without timing advance, or any combination thereof and receive a random access message from the UE based on the configuration message and an uplink timing advance estimated by the UE using the timing advance threshold.

Some examples of the method, apparatuses, and non-transitory computer-readable medium described herein may further include operations, features, means, or instructions for transmitting an indication to the UE enabling uplink timing advance estimation by the UE.

DETAILED DESCRIPTION

User equipment (UE) may perform a random access channel (RACH) procedure to connect to a base station to perform wireless communications. The RACH procedure may include a two-step RACH procedure where the UE transmits a RACH message A (MsgA) and the base station responds with a RACH message B (MsgB), with the RACH MsgA including a RACH preamble as well as small uplink data. Alternatively, the RACH procedure may include a four-step RACH procedure using four RACH messages. The two-step RACH procedure improves latency over the four-step RACH procedure. However, the UE generally is not time synchronized with respect to the base station (e.g., does not have an uplink timing advance) in the two-step RACH procedure, which may reduce reliability for the RACH MsgA and accompanying small uplink data.

Generally, aspects of the techniques described herein provide various mechanisms where a UE (e.g., a UE attempting to establish a connection with a base station via a RACH procedure) without an uplink timing advance value utilizes another UE's timing advance value to estimate its own uplink timing advance for use in the RACH communications with a base station. For example, the RACH UE may receive, via sidelink communications with another UE, an indication of an uplink timing advance of the sidelink UE (e.g., any other UE that the RACH UE has a sidelink connection with). The RACH UE may estimate its uplink timing advance to use for a RACH message transmission to the base station. For example, the RACH UE may use the uplink timing advance of the sidelink UE in combination with the location of the sidelink UE, distance of the sidelink UE from the RACH UE and/or base station, and the like, to identify, measure, or otherwise estimate its own uplink timing advance for the base station. The RACH UE may transmit the random access message (e.g., the RACH MsgA) to the base station using its own, estimated uplink timing advance.

Aspects of the disclosure are initially described in the context of wireless communications systems. Aspects of the disclosure are further illustrated by and described with reference to apparatus diagrams, system diagrams, and flowcharts that relate to uplink timing advance estimation from sidelink.

Figure 1:
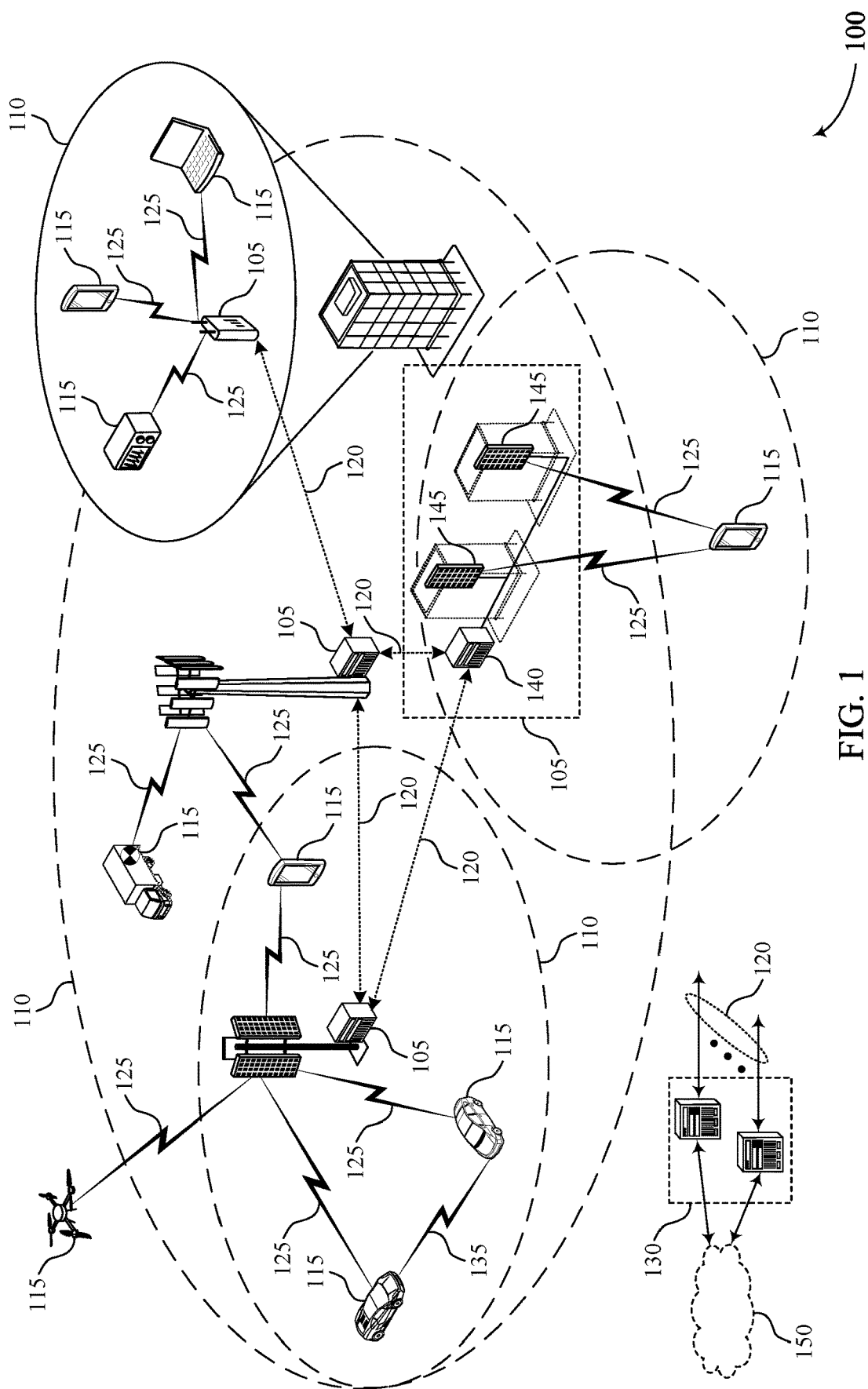
FIG. 1 illustrates an example of a wireless communications system that supports uplink timing advance estimation from sidelink in accordance with aspects of the present disclosure.

FIG. 1 illustrates an example of a wireless communications system 100 that supports uplink timing advance estimation from sidelink in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 (e.g., a transmitting device UE, which may be referred to as a first UE in this example) may receive, from a second UE (e.g., a receiving device UE), an indication of a first uplink timing advance for communications from the second UE to a base station 105. The UE 115 may estimate, based at least in part on the first uplink timing advance received from the second UE, a second uplink timing advance for transmission of a random access message from the first UE to the base station 105. The UE 115 may transmit, to the base station 105, the random access message using the second uplink timing advance.

A UE 115 (e.g., a receiving device UE, which may be referred to as the first UE in this example) may determine an uplink timing advance for a channel between the first UE and a base station 105 serving the first UE. The UE 115 may transmit an indication of the first uplink timing advance to a second UE.

A base station 105 may transmit, to a UE 115 (e.g., a transmitting device), a configuration message indicating a timing advance threshold, wherein the timing advance threshold comprises an estimated timing advance valid time offset, a RSRP threshold with timing advance, a RSRP threshold without timing advance, or any combination thereof. The base station 105 may receive a random access message from the UE 115 based at least in part on the configuration message and an uplink timing advance estimated by the UE 115 using the timing advance threshold.

Figure 2:
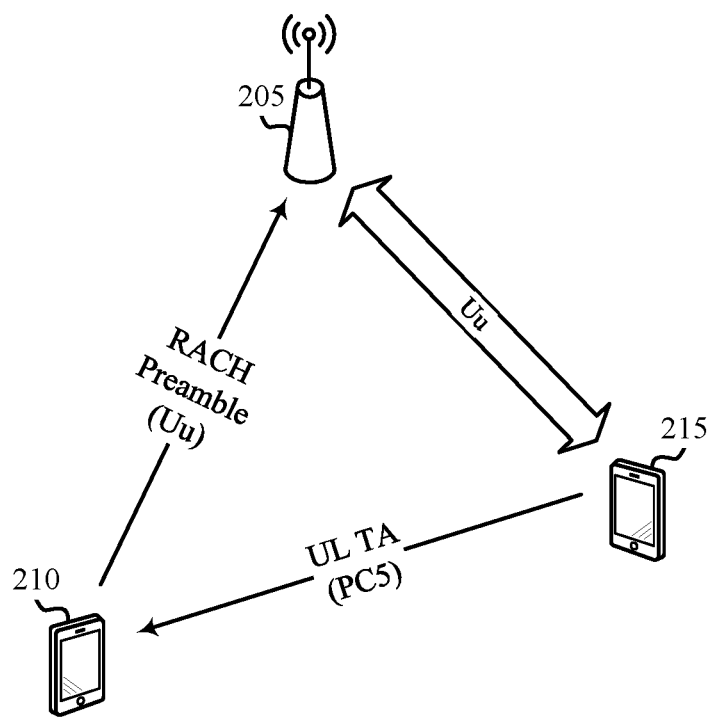
FIG. 2 illustrates an example of a wireless communication system that supports uplink timing advance estimation from sidelink in accordance with aspects of the present disclosure.

FIG. 2 illustrates an example of a wireless communication system 200 that supports uplink timing advance estimation from sidelink in accordance with aspects of the present disclosure. Wireless communication system 200 may implement aspects of wireless communication system 100. Wireless communication system 200 may include base station 205, UE 210, and UE 215, which may be examples of the corresponding devices described herein. In the non-limiting example illustrated in FIG. 2, UE 210 may be considered an example of a UE attempting to perform a RACH procedure with base station 205. UE 210 may have a sidelink and/or relay connection with UE 215.

Wireless communication systems typically use a RACH procedure to enable a UE to establish a connection with a base station (e.g., an initial connection and/or transitioning to an RRC connected state from an RRC inactive or idle state). The RACH procedure may include a Type-1 RACH, which is a 4-step RACH procedure, or a Type-2 RACH, which is a 2-step RACH procedure. The 4-step RACH procedure may include the UE transmitting a random access preamble (RACH message 1 (Msg1)) to the base station, which responds by transmitting a random access response (RACH message 2 (Msg2)) to the UE. The UE then transmits device identification information (RACH message 3 (Msg3)) to the base station, which responds with contention resolution information (RACH message 4 (Msg4)). The 2-step RACH procedure includes the UE transmitting, in step one, a RACH preamble along with reference signals, data, and the UE identification information in the RACH MsgA. The base station responds by transmitting a response message and contention resolution information in the RACH message B (msgB). After the RACH procedure, the UE and base station exchange data over the connection. In the Type-2 RACH procedure, RACH MsgA contains both the RACH preamble as well as a physical uplink shared channel (PUSCH) transmission.

Generally, the UE receives a system information block (SIB) message transmitted from the base station and determines what type of RACH procedure is permitted. For example, the SIB message may indicate whether the base station support Type-1 and/or Type-2 RACH procedure(s) for channel access. In the situation where both the 4-step RACH procedure (e.g., the Type-1 RACH procedure) and the 2-step RACH procedure (e.g., the Type-2 RACH procedure) are supported, the UE may choose which RACH procedure to use for channel access based on a reference signal received power (RSRP) threshold. For example, the UE may monitor and measure one or more downlink signals (e.g., reference signals, system information messages, synchronization messages, and the like) from the base station to determine the RSRP value (e.g., the downlink pathloss) for the base station. If the downlink pathloss reference is above a RSRP threshold (e.g., msgA-RSRP-Threshold), the UE may use the 2-step RACH procedure to connect to the base station. If not, the UE may use the 4-step RACH procedure to connect to the base station. In the situation where only the Type-1 RACH procedure or the Type-2 RACH procedure are supported, the UE may of course use the supported RACH procedure type for channel access.

However, the UE generally sends the RACH MsgA to the base station without uplink timing advance information for the base station. That is, the RACH MsgA transmission may be performed without the UE being synchronized in the time domain with the base station. Since the RACH MsgA is sent without the timing advance information, there may be increased interference for the PUSCH carried in the RACH MsgA (e.g., more interference than generally associated with RACH Msg3 of the 4-step RACH procedure). For example, the UE transmitting the RACH MsgA without being synchronized in the time domain with the base station may reduce the chance that the base station will be able to successfully receive and decode the RACH MsgA. Moreover, having at least some degree of uplink timing advance information for the base station would enable the UE to reduce the msgA-RSRP-Threshold.

Accordingly, aspects of the techniques described herein provide various mechanisms where the UE (e.g., UE 210 in this example, which may also be referred to as a RACH UE or a first UE in some examples) uses uplink timing advance information of UE 215 (which may also be referred to as a sidelink UE or second UE in some examples) for channel access. For example, UE 215 may be communicating with base station 205 via a Uu connection, which may include UE 215 obtaining/maintaining valid uplink timing advance information for base station 205. Accordingly, UE 215 may determine its uplink timing advance for the channel (e.g., the Uu channel) between UE 215 and base station 205.

UE 210 may have a connection with UE 215, such as a sidelink connection, a relay connection (e.g., UE 215 acting as a relay between UE 210 and base station 205), and the like. However, UE 215 may determine that it may perform a RACH procedure to establish a connection with base station 205. For example, UE 210 may be mobile and move to a location where the pathloss value between UE 210 and base station 205 supports wireless communications. In another example, UE 210 may be transitioning to an RRC connected mode and attempt to establish the connection with base station 205 to support wireless communications. Accordingly, UE 210 may determine to send a random access message to base station 205, but may not have uplink timing advance information for base station 205.

Accordingly, UE 210 may receive, identify, obtain, or otherwise determine uplink timing advance information (e.g., a first uplink timing advance in this example) for UE 215 (e.g., the uplink timing advance of UE 215 for base station 205). In one example, this may include UE 210 receiving an indication of the first uplink timing advance from UE 215. For example, UE 215 may broadcast its uplink timing advance information via the sidelink and/or relay connection between UE 215 and UE 210. This may include UE 215 autonomously broadcasting its uplink timing advance information via the shared connection. In another example, this may include UE 210 transmitting a message to UE 215 requesting the indication of the uplink timing advance of UE 215. The request may be transmitted via the shared connection, such as using a sidelink MAC-CE message, a sidelink RRC message, sidelink control information (SCI) message, and the like. In response, UE 215 may transmit the indication of its uplink timing advance (e.g., the first uplink timing advance in this example). The response indicating the uplink timing advance information of UE 215 may be transmitted via the shared channel, such as the sidelink MAC-CE, sidelink RRC message, SCI message, and the like. Accordingly, one UE (e.g., UE 210) in a sidelink scenario may request the other UE (e.g., UE 215) of the sidelink connection to send its uplink timing advance information.

UE 210 may use the uplink timing advance information of UE 215 to estimate its own uplink timing advance (a second uplink timing advance in this example) to use for transmitting a random access message to base station 205. UE 210 estimating its own uplink timing advance based on the uplink timing advance of UE 210 may include UE 210 reusing the uplink timing advance (e.g., using the same uplink timing advance) or estimating a different uplink timing advance.

In some aspects, UE 210 estimating its uplink timing advance using the uplink timing advance of UE 215 may be based on the distance between UE 210 and UE 215. For example, UE 210 may measure, receive an indication of, identify, or otherwise determine the distance between UE 210 (e.g., the first UE in this example) and UE 215 (e.g., the second UE in this example). UE 210 may determine the distance based on receiving an indication of the location of UE 215 from UE 215 and/or from base station 205. Additionally, or alternatively, UE 210 may perform a ranging procedure (e.g., a sidelink ranging procedure) with UE 215 to determine the distance between UE 210 and UE 215 and/or location information for UE 215.

In some aspects, UE 210 may determine whether or not its estimated uplink timing advance is a valid estimation. For example, UE 210 may be configured with a distance threshold from base station 205 (e.g., via RRC signaling during a previous connected state). UE 210 may compare the distance between UE 210 and UE 215 to the distance threshold and estimate its uplink timing advance based on the comparing. For example, if the sidelink distance between UE 210 and UE 215 is larger than the distance threshold, UE 210 may determine not to estimate its uplink timing advance from the uplink timing advance of UE 215 (e.g., UE 210 may treat its estimated uplink timing advance as an invalid uplink timing advance).

In some examples, the distance threshold may be based on the uplink timing advance information of UE 215. For example, when UE 215 is an edge UE of base station 205 (e.g., located near the edge of the coverage area of base station 205), its uplink timing advance value may be higher than when UE 215 is located closer to base station 205. Accordingly, the distance threshold may be adjusted based on the uplink timing advance of UE 215 (e.g., for a larger uplink timing advance of UE 215, the distance threshold may also be adjusted to be larger).

Additionally, or alternatively, the distance threshold may be based on the receive beam of UE 210 and/or UE 215. For example, UE 210 may use a receive beam for communications with base station 205 (e.g., during a previous connected state). The receive beam may correspond to a spatial/directional parameter used for such communications. Similarly, UE 215 may use its own receive beam for its communications with base station 205 (e.g., for receiving SSB). In some examples, UE 215 may transmit or otherwise provide its spatial information regarding its receive beam used for receiving SSB to UE 210. If the receive beam of UE 215 is the same as, or within a threshold range of, the receive beam of UE 210, then the distance threshold may be adjusted accordingly. For example, if the receive beams of UE 210 and UE 215 are similar (e.g., within a threshold range), the distance threshold may be adjusted to be larger.

Accordingly, UE 210 may select between the 2-step RACH procedure and the 4-step RACH procedure (when both are supported) based on its estimated uplink timing advance that is estimated based on the uplink timing advance of UE 215. UE 210 may select the RACH procedure using the estimated uplink timing advance and based at least in part on a timing advance threshold. For example, UE 210 may receive RRC configuration signaling from base station 205 carrying or otherwise conveying an indication of the timing advance threshold of UE 210. The timing advance threshold parameters may include, but are not limited to, an estimated uplink timing advance valid timing offset (e.g., TA-estimation-valid-time-offset), a RSRP threshold with timing advance (e.g., msgA-RSRP-Threshold-with-TA), an RSRP threshold without timing advance (e.g., msgA-RSRP-Threshold-without-TA), and the like.

UE 210 may estimate the time (e.g., the symbol(s)/slot(s)) for transmitting the random access message to base station 205. If the uplink timing advance of UE 210 is estimated more than the TA-estimation-valid-time-offset ahead of the transmit time for the random access message (which may be regarded as the case where there is no valid estimated uplink timing advance), UE 210 may select between the 2-step RACH procedure or the 4-step RACH procedure. UE 210 may determine if the RSRP of the downlink pathloss is above msgA-RSRP-Threshold-without-TA. If so, UE 210 may select the 2-step RACH procedure and transmit the RACH MsgA. If not, UE 210 may select the 4-step RACH procedure and transmit the RACH Msg1.

If the uplink timing advance of UE 210 is estimated less than (e.g., within) the TA-estimation-valid-time-offset ahead of the transmit time for the random access message, UE 210 may select between the 2-step RACH procedure or the 4-step RACH procedure. UE 210 may determine if the RSRP of the downlink pathloss is above msgA-RSRP-Threshold-with-TA. If so, UE 210 may select the 2-step RACH procedure and transmit the RACH MsgA. If not, UE 210 may select the 4-step RACH procedure and transmit the RACH Msg1.

Accordingly, UE 210 may identify or otherwise select between the 2-step and 4-step RACH procedures based on the uplink timing advance estimated based on the uplink timing advance of UE 215. UE 210 may transmit or otherwise provide the random access message to base station 205 according to the estimated uplink timing advance (e.g., the second uplink timing advance in this example).

Figure 3:
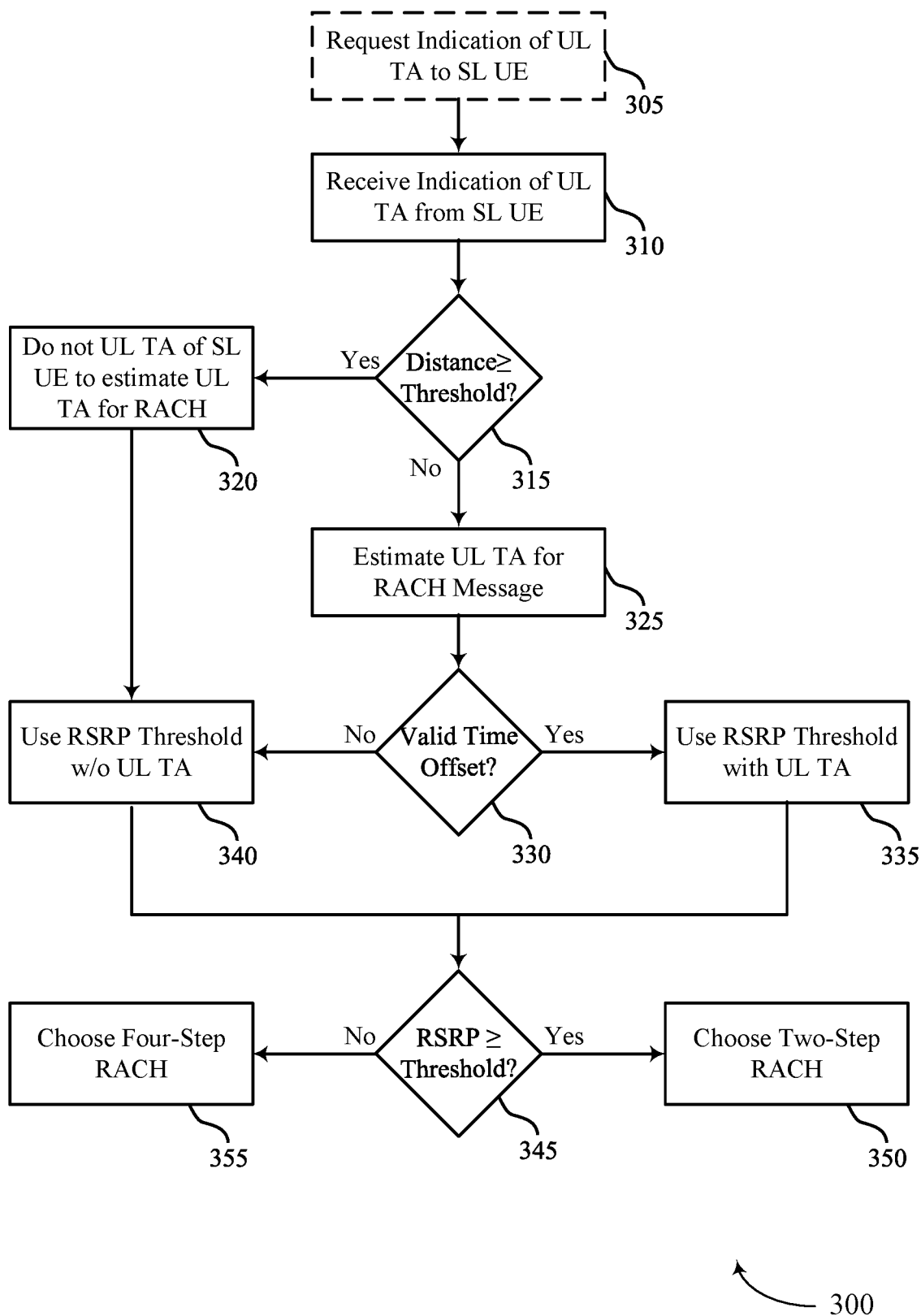
FIG. 3 illustrates an example of a method that supports uplink timing advance estimation from sidelink in accordance with aspects of the present disclosure.

FIG. 3 illustrates an example of a method 300 that supports uplink timing advance estimation from sidelink in accordance with aspects of the present disclosure. Aspects of method 300 may implement aspects of wireless communication systems 100 and/or 200. Aspects of method 300 may be implemented at or implemented by a UE and/or base station, which may be examples of the corresponding devices described herein. For simplicity, method 300 will be described from the perspective of a RACH UE, which may refer to a UE seeking to perform a RACH procedure with a base station, while having a connection to another UE (which may be referred to as a sidelink UE and/or relay UE).

At 305, the RACH UE may transmit or otherwise provide a signal/message to the sidelink UE requesting an indication of uplink timing advance (e.g., a first uplink timing advance in this example) information of the sidelink UE. For example, the sidelink UE may be performing communications with a base station and obtain/maintain an uplink timing advance for the base station. The uplink timing advance may provide a mechanism to improve/maintain timing synchronization between the sidelink UE and the base station. The request may be transmitted or otherwise conveyed in a sidelink MAC-CE, sidelink RRC signaling, one or more SCI, and the like.

At 310, the RACH UE may be receive an indication of the uplink timing advance of the sidelink UE. The indication of the uplink timing advance may be received in response to the request from the RACH UE and/or may be received based on the sidelink UE broadcasting its uplink timing advance information over the sidelink/relay connection between the RACH UE and the sidelink UE. The indication of the uplink timing advance of the sidelink UE may be received in a sidelink MAC-CE, sidelink RRC signaling, one or more SCI, and the like.

At 315, the RACH UE may determine whether the distance between the RACH UE and the sidelink UE satisfies or is greater than a distance threshold. For example, the RACH UE may be configured with a distance threshold from the base station (e.g., using RRC signaling during a previous connected state and/or using broadcast signaling obtained from the base station). The RACH UE may determine the location of the sidelink UE (e.g., using sidelink ranging and/or an indication received from the sidelink UE) and use its own location information to measure, identify, or otherwise determine the distance between the RACH UE and the sidelink UE. The RACH UE may compare the distance to the distance threshold to determine whether the uplink timing advance of the sidelink UE can be used to estimate its own uplink timing advance (e.g., a second uplink timing advance in this example). If the distance is equal to or greater than the distance threshold, at 320 the RACH UE may not use the uplink timing advance of the sidelink UE to estimate its uplink timing advance to use for a RACH message.

If the distance is less than the distance threshold, at 325 the RACH UE may estimate its uplink timing advance to use for a RACH procedure based on the uplink timing advance of the sidelink UE. For example, the RACH UE may reuse the uplink timing advance of the sidelink UE if the distance is less than a first threshold and/or may estimate a unique uplink timing advance if the distance is greater than the first threshold but less than a second threshold. That is, the RACH UE may use the distance between it and the sidelink UE, in addition to the uplink timing advance of the sidelink UE, to estimate its uplink timing advance. In some examples, the distance threshold may be adjusted based on the uplink timing advance of the sidelink UE (e.g., whether the uplink timing advance of the sidelink UE is large, indicating an edge UE, or small, indicating that the sidelink UE is close to the base station).

At 330, the RACH UE may identify or otherwise determine whether the estimated uplink timing advance (e.g., the second uplink timing advance in this example) is within a valid time offset (e.g., TA-estimation-valid-time-offset). For example, the RACH UE may select or otherwise identify the symbol(s), slot(s), etc., to use to transmit the RACH message to the base station. Based on the age of the estimated uplink timing advance (e.g., when the uplink timing advance was estimated compared to the anticipated transmit time of the RACH message), the RACH UE may determine whether the estimated uplink timing advance is still valid.

If the estimated uplink timing advance time offset is valid (e.g., the estimated uplink timing advance can be used), at 335 the RACH UE may select a RSRP threshold value with uplink timing advance to use for selecting between the 2-step RACH procedure and the 4-step RACH procedure. If the estimated uplink timing advance time offset is invalid (e.g., the estimated uplink timing advance cannot be used or is otherwise considered as invalid), at 340 the RACH UE may select a RSRP threshold value without uplink timing advance to use for selecting between the 2-step RACH procedure and the 4-step RACH procedure For example, the base station may RRC configure the RACH UE (e.g., during a previous connected state and/or via the sidelink UE) with the msgA-RSRP-Threshold-with-TA parameter and the msgA-RSRP-Threshold-without-TA parameter.

Accordingly, at 345 the RACH UE may identify or otherwise determine whether to select the 2-step RACH procedure or the 4-step RACH procedure. For example, if the estimated uplink timing advance is valid (e.g., within the TA-estimation-valid-time-offset), the RACH UE may use the RSRP threshold with uplink timing advance to determine whether the channel condition (e.g., pathloss reference) between the RACH UE and the base station supports selecting the 2-step RACH procedure at 350. If the estimated uplink timing advance is invalid (e.g., not within the TA-estimation-valid-time-offset), the RACH UE may use the RSRP threshold without uplink timing advance to determine whether the channel condition (e.g., pathloss reference) between the RACH UE and the base station supports selecting the 4-step RACH procedure at 355.

Accordingly, the RACH UE may select a random access message (e.g., the first RACH message, which may be a RACH MsgA in the 2-step RACH procedure or the RACH Msg1 in the 4-step RACH procedure) to the base station.

Figure 4:
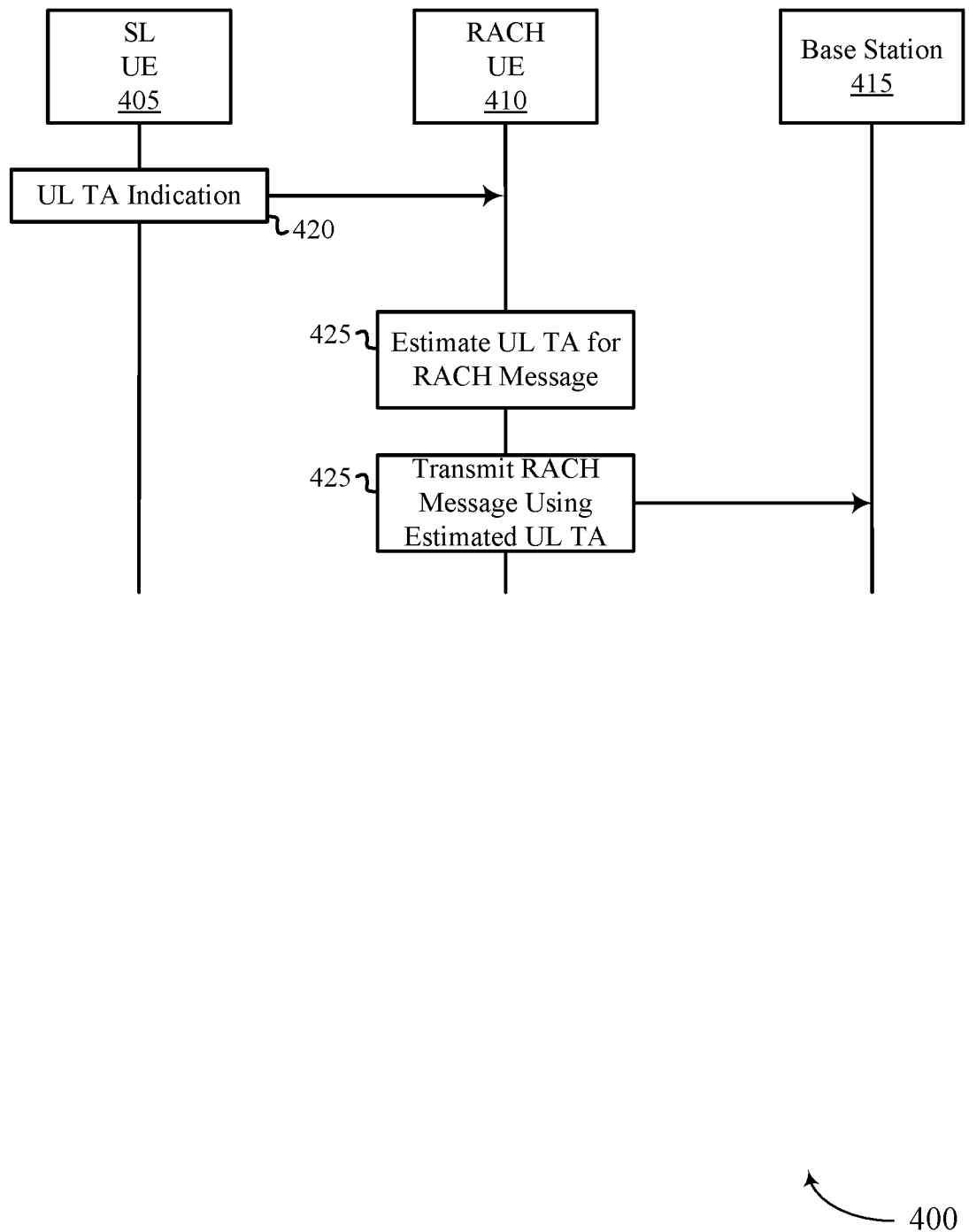
FIG. 4 illustrates an example of a process that supports uplink timing advance estimation from sidelink in accordance with aspects of the present disclosure.

FIG. 4 illustrates an example of a process 400 that supports uplink timing advance estimation from sidelink in accordance with aspects of the present disclosure. Aspects of process 400 may implement aspects of wireless communication systems 100 and/or 200 and/or method 300. Aspects of process 400 may be implemented at or implemented by sidelink UE 405, RACH UE 410, and/or base station 415, which may be examples of the corresponding devices described herein.

At 420, sidelink UE 405 may transmit or otherwise provide (and RACH UE 410 may receive or otherwise obtain) an indication of a first uplink timing advance. The first uplink timing advance may generally correspond to the uplink timing advance of the sidelink UE 405 used for communications between sidelink UE 405 and base station 415. The indication of the uplink timing advance of the sidelink UE 405 may be receive via a sidelink MAC-CE, sidelink RRC signaling, and/or via one or more SCI messages. In some examples, the indication of the uplink timing advance of the sidelink UE 405 may be broadcast over a sidelink and/or relay channel between the sidelink UE 405 and the RACH UE 410. The indication of the uplink timing advance of the sidelink UE 405 may be received in response to a request transmitted by the RACH UE 410. The request may also be transmitted via a sidelink MAC-CE, sidelink RRC signaling, and/or one or more SCI messages.

At 425, the RACH UE 410 may identify, estimate, or otherwise determine a second uplink timing advance to use for a RACH procedure with base station 415 based, at least to some degree, on the uplink timing advance of sidelink UE 405. For example, the RACH UE 410 may determine the distance between the sidelink UE 405 and the RACH UE 410 and compare that distance to a distance threshold. The second uplink timing advance of RACH UE 410 may be estimated based at least in part on the comparison. In some examples, the distance threshold may be configured for RACH UE 410 by base station 415 (e.g., via RRC signaling). In some examples, the distance threshold may be adjusted based on the uplink timing advance of sidelink UE 405 (e.g., larger distance threshold for a larger uplink timing advance). In some examples, the distance threshold may be adjusted based on the receive beams of sidelink UE 405 and RACH UE 410. For example, the distance threshold may be reduced when the receive beams of both UEs are similar or increased when the receive beams are not.

At 430, the RACH UE 410 may transmit or otherwise provide (and base station 415 may receive or otherwise obtain) a random access message according to the estimated uplink timing advance (e.g., the second uplink timing advance in this example). Accordingly, the RACH UE 410 may select between the 2-step RACH procedure and the 4-step RACH procedure based on the estimated uplink timing advance that is based, at least to some degree, on the indicated uplink timing advance of the sidelink UE 405. Based on the validity of the estimated uplink timing advance (e.g., in the time domain with respect to an anticipated transmit time for the RACH message), RACH UE 410 may use an appropriately configured RSRP threshold (e.g. with or without TA) to select between the 2-step RACH procedure and the 4-step RACH procedure. When the 2-step RACH procedure is selected, the RACH message may include a RACH MsgA transmission. When the 4-step RACH procedure is selected, the RACH message may include a RACH Msg1 transmission. The RACH UE 410 may perform the selected RACH procedure according to the estimated uplink timing advance to establish a connection with base station 415. Accordingly, the RACH UE 410 and base station 415 may communicate via the connection.

Figure 5:
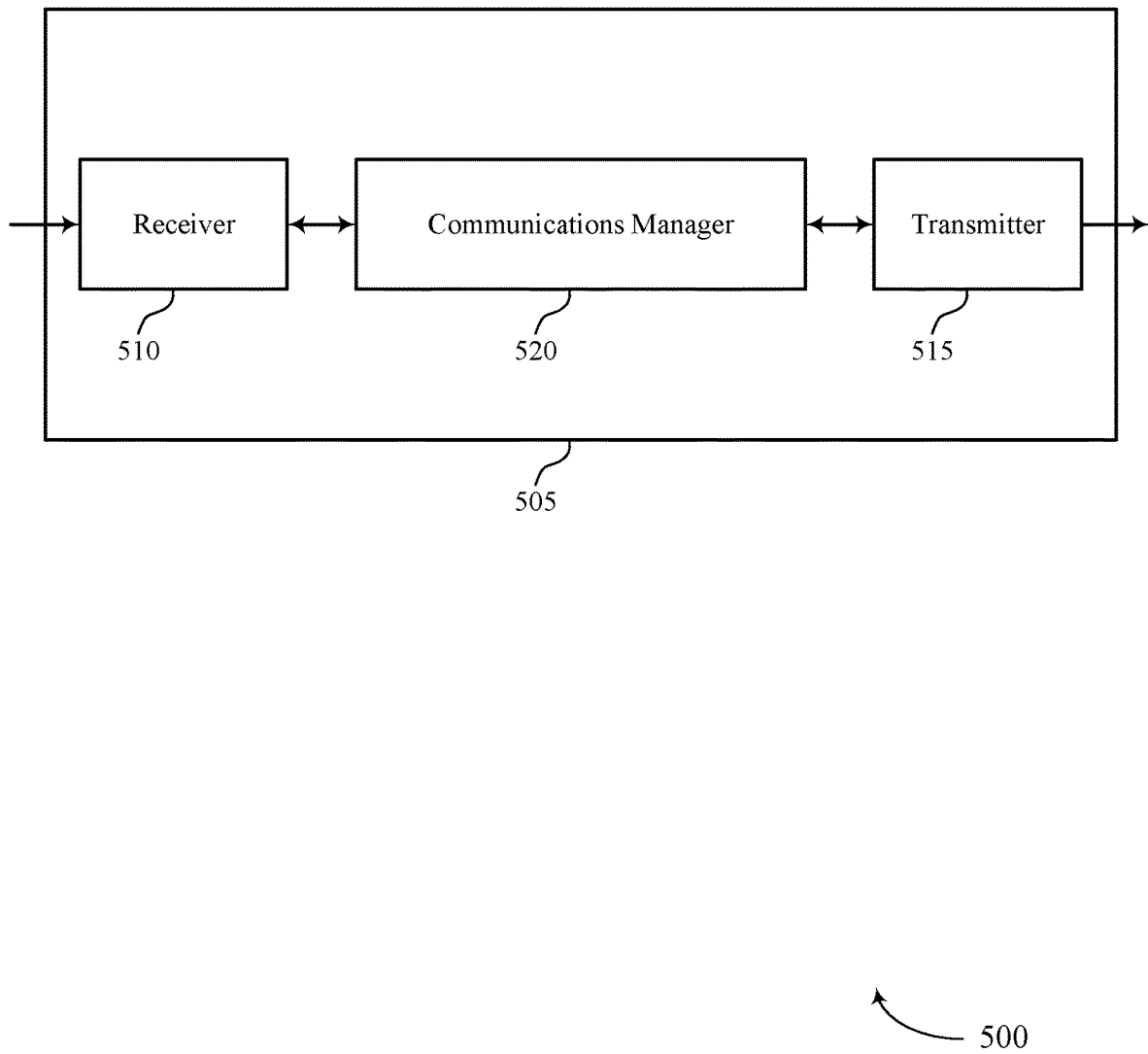
FIGS. 5 and 6 show block diagrams of devices that support uplink timing advance estimation from sidelink in accordance with aspects of the present disclosure.

FIG. 5 shows a block diagram 500 of a device 505 that supports uplink timing advance estimation from sidelink in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to uplink timing advance estimation from sidelink). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to uplink timing advance estimation from sidelink). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of uplink timing advance estimation from sidelink as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. For example, the communications manager 520 may be configured as or otherwise support a means for receiving, from a second UE, an indication of a first uplink timing advance for communications from the second UE to a base station. The communications manager 520 may be configured as or otherwise support a means for estimating, based on the first uplink timing advance received from the second UE, a second uplink timing advance for transmission of a random access message from the first UE to the base station. The communications manager 520 may be configured as or otherwise support a means for transmitting, to the base station, the random access message using the second uplink timing advance.

Additionally or alternatively, the communications manager 520 may support wireless communication at a first UE in accordance with examples as disclosed herein. For example, the communications manager 520 may be configured as or otherwise support a means for determining an uplink timing advance for a channel between the first UE and a base station serving the first UE. The communications manager 520 may be configured as or otherwise support a means for transmitting an indication of the first uplink timing advance to a second UE.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for a RACH UE to leverage an uplink timing advance of a sidelink UE to estimate an uplink timing advance for a RACH message transmission to the base station.

Figure 6:
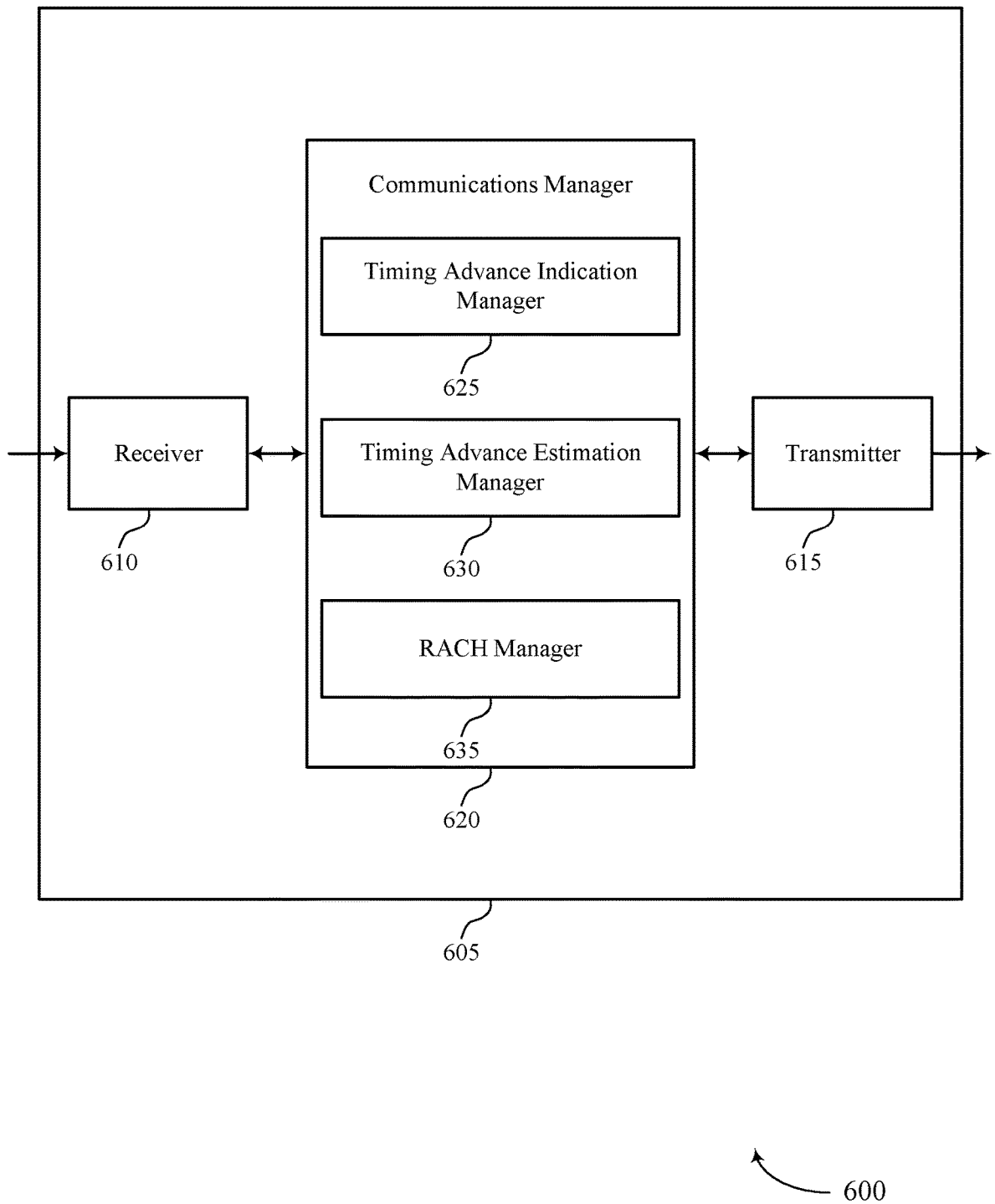

FIG. 6 shows a block diagram 600 of a device 605 that supports uplink timing advance estimation from sidelink in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to uplink timing advance estimation from sidelink). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to uplink timing advance estimation from sidelink). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of uplink timing advance estimation from sidelink as described herein. For example, the communications manager 620 may include a timing advance indication manager 625, a timing advance estimation manager 630, a RACH manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. The timing advance indication manager 625 may be configured as or otherwise support a means for receiving, from a second UE, an indication of a first uplink timing advance for communications from the second UE to a base station. The timing advance estimation manager 630 may be configured as or otherwise support a means for estimating, based on the first uplink timing advance received from the second UE, a second uplink timing advance for transmission of a random access message from the first UE to the base station. The RACH manager 635 may be configured as or otherwise support a means for transmitting, to the base station, the random access message using the second uplink timing advance.

Additionally or alternatively, the communications manager 620 may support wireless communication at a first UE in accordance with examples as disclosed herein. The timing advance indication manager 625 may be configured as or otherwise support a means for determining an uplink timing advance for a channel between the first UE and a base station serving the first UE. The timing advance indication manager 625 may be configured as or otherwise support a means for transmitting an indication of the first uplink timing advance to a second UE.

Figure 7:
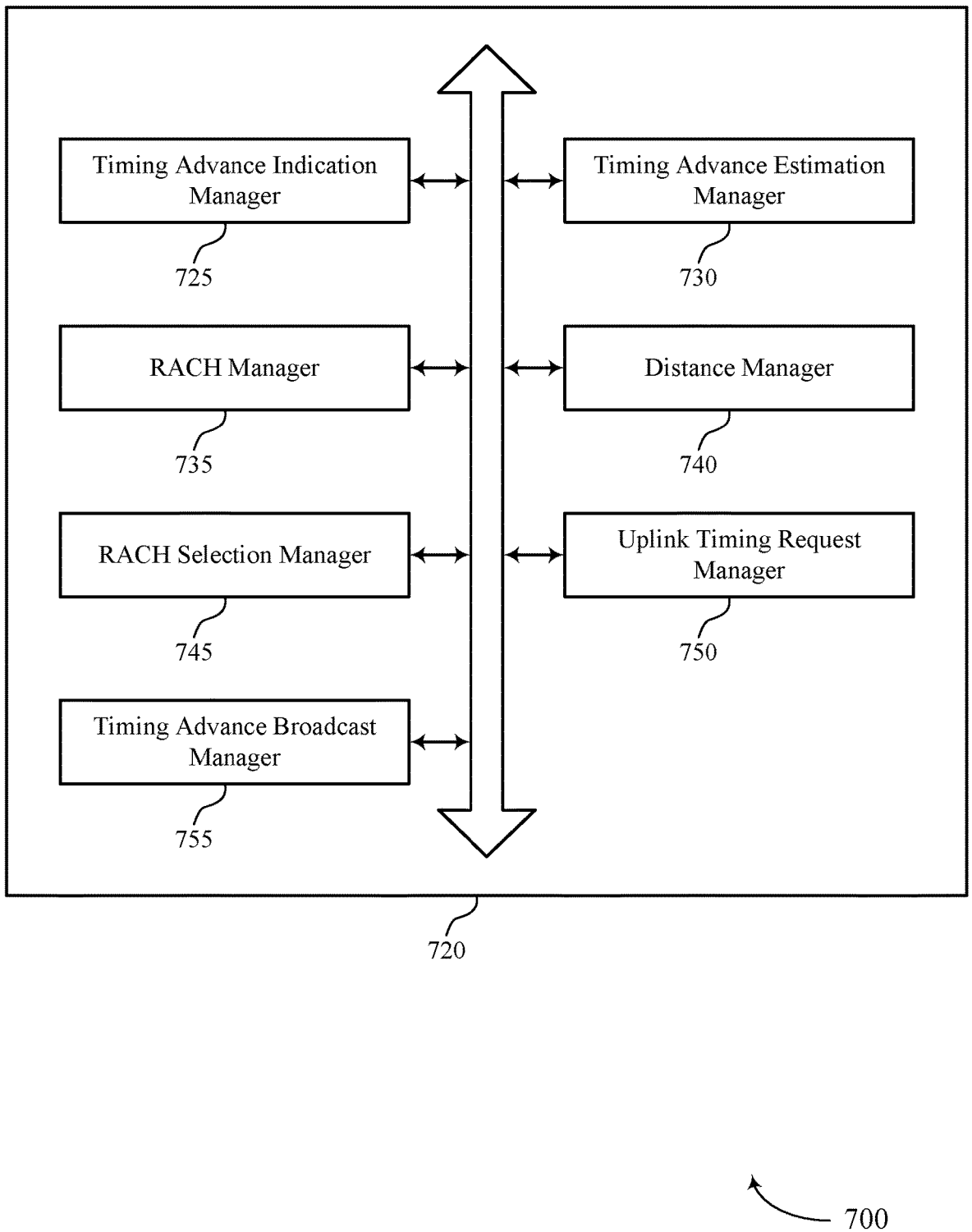
FIG. 7 shows a block diagram of a communications manager that supports uplink timing advance estimation from sidelink in accordance with aspects of the present disclosure.

FIG. 7 shows a block diagram 700 of a communications manager 720 that supports uplink timing advance estimation from sidelink in accordance with aspects of the present disclosure. The communications manager 720 may be an example of aspects of a communications manager 520, a communications manager 620, or both, as described herein. The communications manager 720, or various components thereof, may be an example of means for performing various aspects of uplink timing advance estimation from sidelink as described herein. For example, the communications manager 720 may include a timing advance indication manager 725, a timing advance estimation manager 730, a RACH manager 735, a distance manager 740, a RACH selection manager 745, an uplink timing request manager 750, a timing advance broadcast manager 755, or any combination thereof. Each of these components may communicate, directly or indirectly, with one another (e.g., via one or more buses).

The communications manager 720 may support wireless communication at a first UE in accordance with examples as disclosed herein. The timing advance indication manager 725 may be configured as or otherwise support a means for receiving, from a second UE, an indication of a first uplink timing advance for communications from the second UE to a base station. The timing advance estimation manager 730 may be configured as or otherwise support a means for estimating, based on the first uplink timing advance received from the second UE, a second uplink timing advance for transmission of a random access message from the first UE to the base station. The RACH manager 735 may be configured as or otherwise support a means for transmitting, to the base station, the random access message using the second uplink timing advance.

In some examples, to support estimating the second uplink timing advance, the distance manager 740 may be configured as or otherwise support a means for determining a distance between the first UE and the second UE. In some examples, to support estimating the second uplink timing advance, the distance manager 740 may be configured as or otherwise support a means for comparing the distance with a distance threshold. In some examples, to support estimating the second uplink timing advance, the distance manager 740 may be configured as or otherwise support a means for estimating the second uplink timing advance based on the comparing of the distance with the distance threshold.

In some examples, to support determining the distance, the distance manager 740 may be configured as or otherwise support a means for receiving an indication of the distance threshold from the base station, the second UE, or both. In some examples, the distance manager 740 may be configured as or otherwise support a means for adjusting the distance threshold based on the first uplink timing advance. In some examples, the distance manager 740 may be configured as or otherwise support a means for adjusting the distance threshold based on a comparison of a first receive beam of the first UE and a second receive beam of the second UE, where the first receive beam and the second receive beam are used by the first UE and the second UE, respectively, for receiving synchronization signal blocks from the base station. In some examples, to support determining the distance, the distance manager 740 may be configured as or otherwise support a means for performing a ranging procedure for the second UE based on a sidelink connection between the first UE and the second UE.

In some examples, the RACH selection manager 745 may be configured as or otherwise support a means for selecting between a four-step random access procedure and a two-step random access procedure based on a comparison of the second uplink timing advance with a timing advance threshold, where in the random access message is a first uplink random access message in either the four-step random access procedure or the two-step random access procedure. In some examples, the RACH selection manager 745 may be configured as or otherwise support a means for receiving an RRC configuration message from the base station indicating the timing advance threshold, where the timing advance threshold includes an estimated timing advance valid time offset, a RSRP threshold with timing advance, a RSRP threshold without timing advance, or any combination thereof.

In some examples, the RACH selection manager 745 may be configured as or otherwise support a means for comparing an estimation time for the second uplink timing advance to a transmit time of the random access message according to the estimated timing advance valid time offset. In some examples, the RACH selection manager 745 may be configured as or otherwise support a means for selecting the two-step random access procedure based on the estimation time for the second uplink timing advance being within the estimated timing advance time offset. In some examples, the RACH selection manager 745 may be configured as or otherwise support a means for selecting the two-step random access procedure based on comparing a measured RSRP value for a channel between the first UE and the base station to the RSRP threshold with timing advance.

In some examples, the uplink timing request manager 750 may be configured as or otherwise support a means for transmitting, via a sidelink connection between the first UE and the second UE, a message to the second UE requesting the indication of the first uplink timing advance, where the indication of the first uplink timing advance is received based on the message. In some examples, the message includes a sidelink MAC-CE message, a sidelink RRC message, or any combination thereof. In some examples, the indication of the first uplink timing advance is received via a sidelink MAC-CE message, a sidelink RRC message, or any combination thereof. In some examples, the second uplink timing advance is a same timing advance as the first uplink timing advance.

Additionally or alternatively, the communications manager 720 may support wireless communication at a first UE in accordance with examples as disclosed herein. In some examples, the timing advance indication manager 725 may be configured as or otherwise support a means for determining an uplink timing advance for a channel between the first UE and a base station serving the first UE. In some examples, the timing advance indication manager 725 may be configured as or otherwise support a means for transmitting an indication of the first uplink timing advance to a second UE.

In some examples, the uplink timing request manager 750 may be configured as or otherwise support a means for receiving, via a sidelink connection between the first UE and a second UE, a message from the second UE requesting an indication of the first uplink timing advance of the first UE, where the indication of the first uplink timing advance is transmitted based on the message.

In some examples, the timing advance broadcast manager 755 may be configured as or otherwise support a means for broadcasting the indication of the first uplink timing advance via a sidelink connection between the first UE and the second UE.

In some examples, the distance manager 740 may be configured as or otherwise support a means for determining a location of the first UE. In some examples, the distance manager 740 may be configured as or otherwise support a means for transmitting an indication of the location of the first UE to the second UE.

Figure 8:
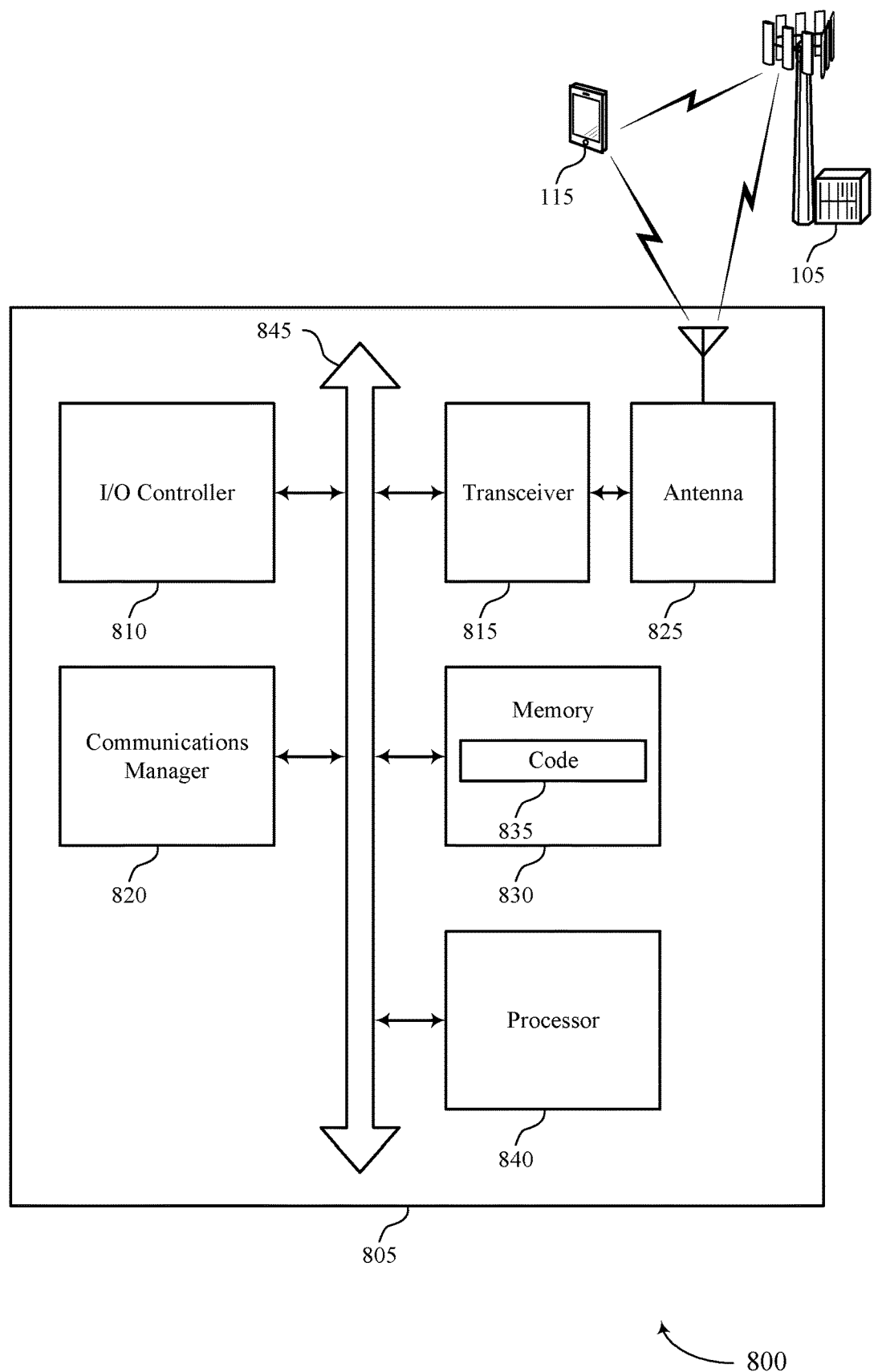
FIG. 8 shows a diagram of a system including a device that supports uplink timing advance estimation from sidelink in accordance with aspects of the present disclosure.

FIG. 8 shows a diagram of a system 800 including a device 805 that supports uplink timing advance estimation from sidelink in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting uplink timing advance estimation from sidelink). For example, the device 805 or a component of the device 805 may include a processor 840 and memory 830 coupled with or to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for receiving, from a second UE, an indication of a first uplink timing advance for communications from the second UE to a base station. The communications manager 820 may be configured as or otherwise support a means for estimating, based on the first uplink timing advance received from the second UE, a second uplink timing advance for transmission of a random access message from the first UE to the base station. The communications manager 820 may be configured as or otherwise support a means for transmitting, to the base station, the random access message using the second uplink timing advance.

Additionally or alternatively, the communications manager 820 may support wireless communication at a first UE in accordance with examples as disclosed herein. For example, the communications manager 820 may be configured as or otherwise support a means for determining an uplink timing advance for a channel between the first UE and a base station serving the first UE. The communications manager 820 may be configured as or otherwise support a means for transmitting an indication of the first uplink timing advance to a second UE.

By including or configuring the communications manager 820 in accordance with examples as described herein, the device 805 may support techniques for a RACH UE to leverage an uplink timing advance of a sidelink UE to estimate an uplink timing advance for a RACH message transmission to the base station.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of uplink timing advance estimation from sidelink as described herein, or the processor 840 and the memory 830 may be otherwise configured to perform or support such operations.

Figure 9:
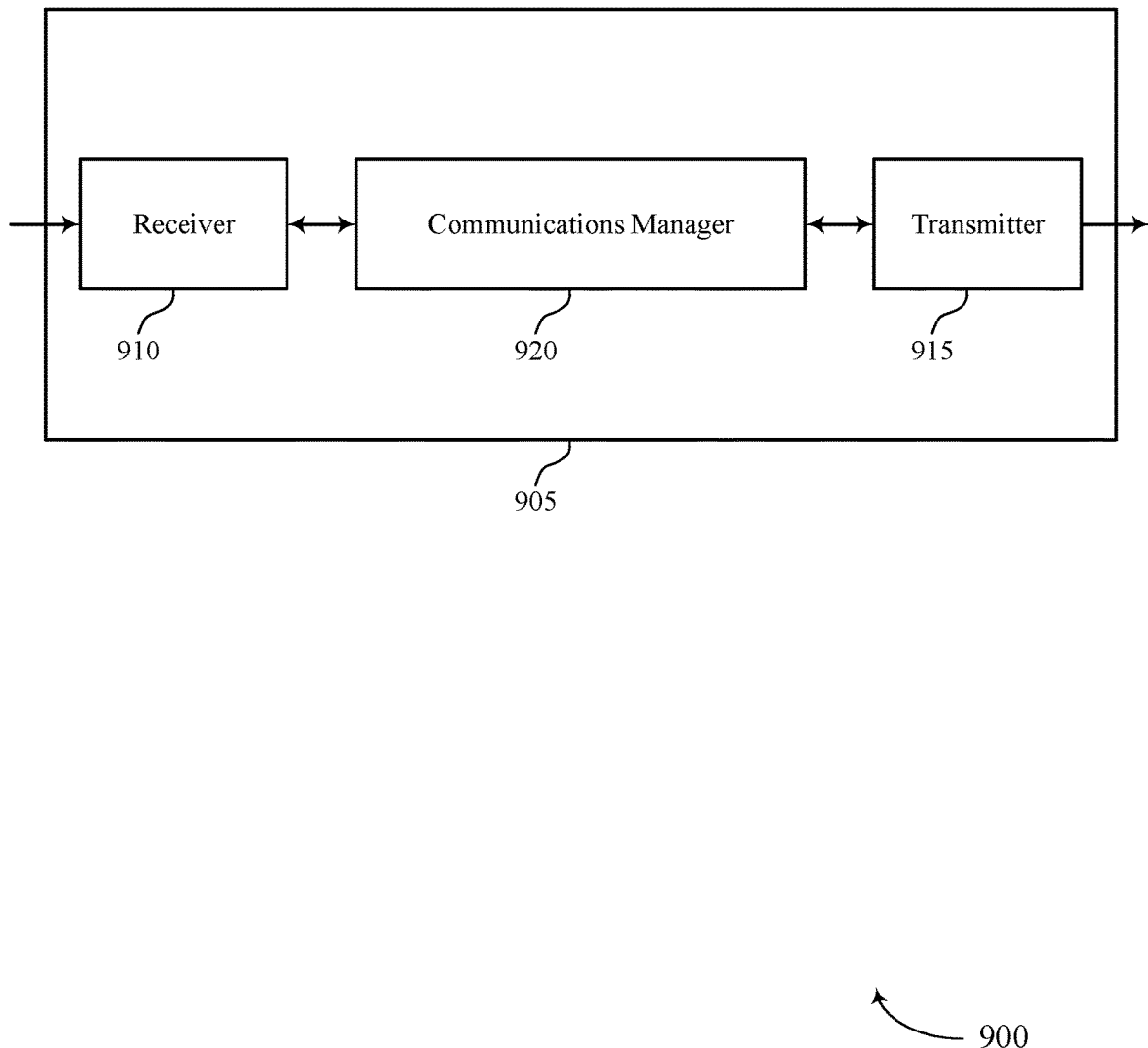
FIGS. 9 and 10 show block diagrams of devices that support uplink timing advance estimation from sidelink in accordance with aspects of the present disclosure.

FIG. 9 shows a block diagram 900 of a device 905 that supports uplink timing advance estimation from sidelink in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to uplink timing advance estimation from sidelink). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to uplink timing advance estimation from sidelink). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of uplink timing advance estimation from sidelink as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting, to a UE, a configuration message indicating a timing advance threshold, where the timing advance threshold includes an estimated timing advance valid time offset, a RSRP threshold with timing advance, a RSRP threshold without timing advance, or any combination thereof. The communications manager 920 may be configured as or otherwise support a means for receiving a random access message from the UE based on the configuration message and an uplink timing advance estimated by the UE using the timing advance threshold.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for a RACH UE to leverage an uplink timing advance of a sidelink UE to estimate an uplink timing advance for a RACH message transmission to the base station.

Figure 10:
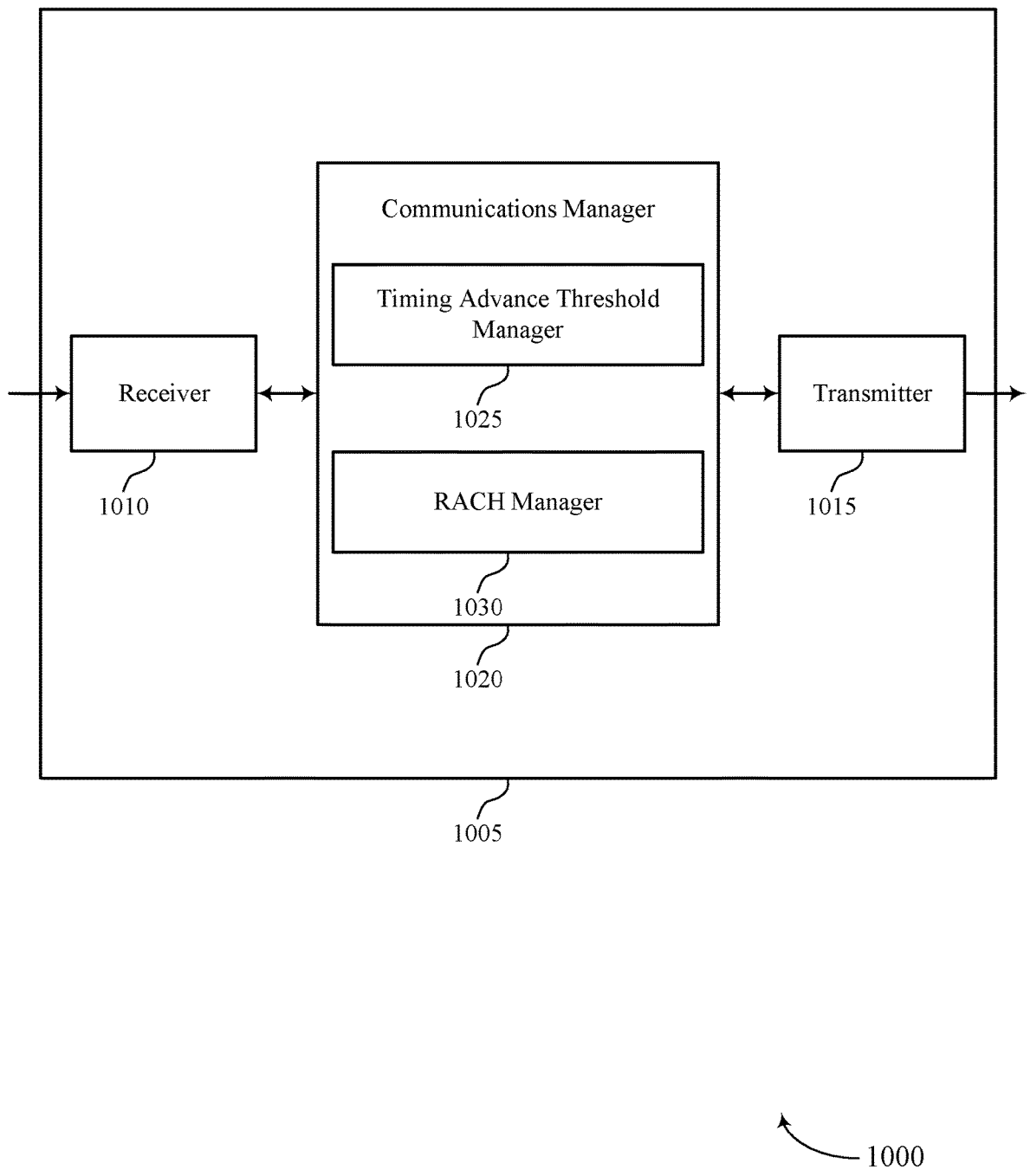

FIG. 10 shows a block diagram 1000 of a device 1005 that supports uplink timing advance estimation from sidelink in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to uplink timing advance estimation from sidelink). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to uplink timing advance estimation from sidelink). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of uplink timing advance estimation from sidelink as described herein. For example, the communications manager 1020 may include a timing advance threshold manager 1025 a RACH manager 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The timing advance threshold manager 1025 may be configured as or otherwise support a means for transmitting, to a UE, a configuration message indicating a timing advance threshold, where the timing advance threshold includes an estimated timing advance valid time offset, a RSRP threshold with timing advance, a RSRP threshold without timing advance, or any combination thereof. The RACH manager 1030 may be configured as or otherwise support a means for receiving a random access message from the UE based on the configuration message and an uplink timing advance estimated by the UE using the timing advance threshold.

Figure 11:
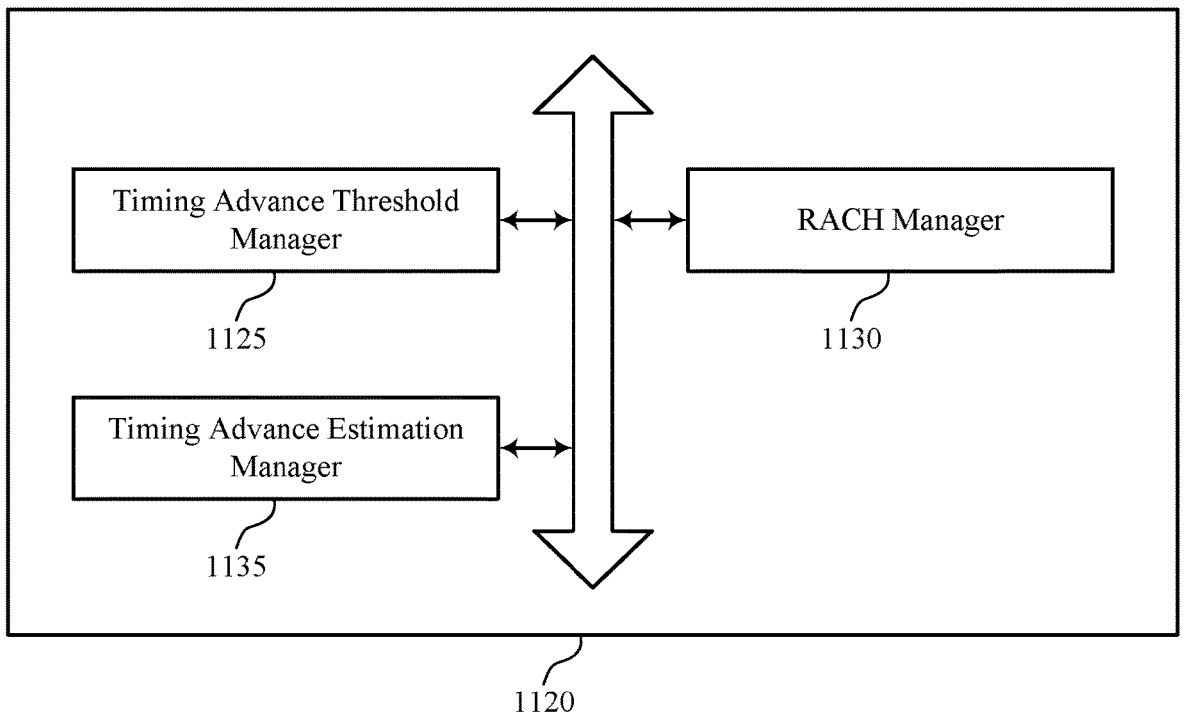
FIG. 11 shows a block diagram of a communications manager that supports uplink timing advance estimation from sidelink in accordance with aspects of the present disclosure.

FIG. 11 shows a block diagram 1100 of a communications manager 1120 that supports uplink timing advance estimation from sidelink in accordance with aspects of the present disclosure. The communications manager 1120 may be an example of aspects of a communications manager 920, a communications manager 1020, or both, as described herein. The communications manager 1120, or various components thereof, may be an example of means for performing various aspects of uplink timing advance estimation from sidelink as described herein. For example, the communications manager 1120 may include a timing advance threshold manager 1125, a RACH manager 1130, a timing advance estimation manager 1135, or any combination thereof. Each of these components may communicate, directly or indirectly, with one another (e.g., via one or more buses).

The communications manager 1120 may support wireless communication at a base station in accordance with examples as disclosed herein. The timing advance threshold manager 1125 may be configured as or otherwise support a means for transmitting, to a UE, a configuration message indicating a timing advance threshold, where the timing advance threshold includes an estimated timing advance valid time offset, a RSRP threshold with timing advance, a RSRP threshold without timing advance, or any combination thereof. The RACH manager 1130 may be configured as or otherwise support a means for receiving a random access message from the UE based on the configuration message and an uplink timing advance estimated by the UE using the timing advance threshold.

In some examples, the timing advance estimation manager 1135 may be configured as or otherwise support a means for transmitting an indication to the UE enabling uplink timing advance estimation by the UE.

Figure 12:
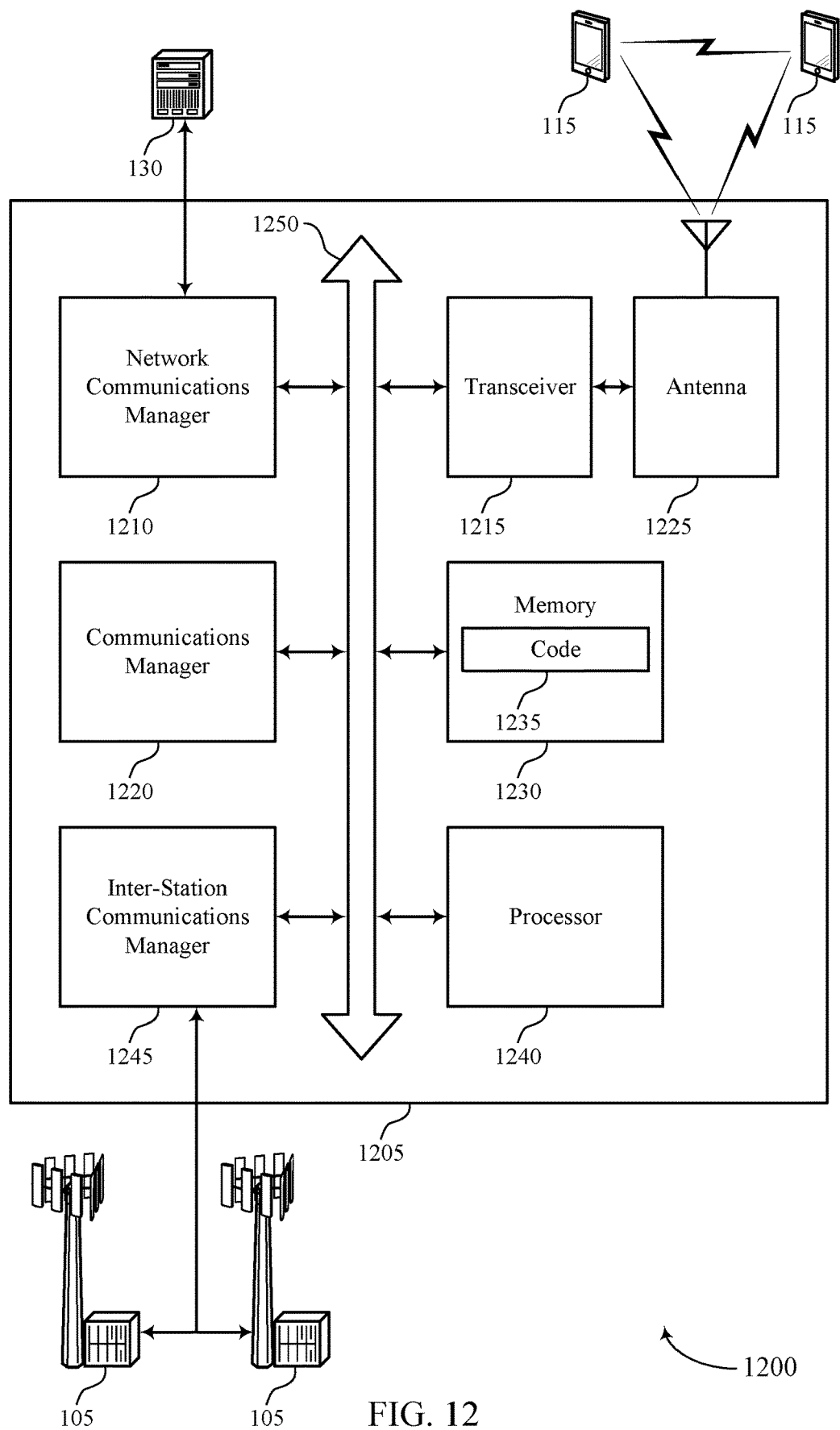
FIG. 12 shows a diagram of a system including a device that supports uplink timing advance estimation from sidelink in accordance with aspects of the present disclosure.

FIG. 12 shows a diagram of a system 1200 including a device 1205 that supports uplink timing advance estimation from sidelink in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting uplink timing advance estimation from sidelink). For example, the device 1205 or a component of the device 1205 may include a processor 1240 and memory 1230 coupled with or to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, to a UE, a configuration message indicating a timing advance threshold, where the timing advance threshold includes an estimated timing advance valid time offset, a reference signal received power (RSRP) threshold with timing advance, a RSRP threshold without timing advance, or any combination thereof. The communications manager 1220 may be configured as or otherwise support a means for receiving a random access message from the UE based on the configuration message and an uplink timing advance estimated by the UE using the timing advance threshold.

By including or configuring the communications manager 1220 in accordance with examples as described herein, the device 1205 may support techniques for a RACH UE to leverage an uplink timing advance of a sidelink UE to estimate an uplink timing advance for a RACH message transmission to the base station.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of uplink timing advance estimation from sidelink as described herein, or the processor 1240 and the memory 1230 may be otherwise configured to perform or support such operations.

Figure 13:
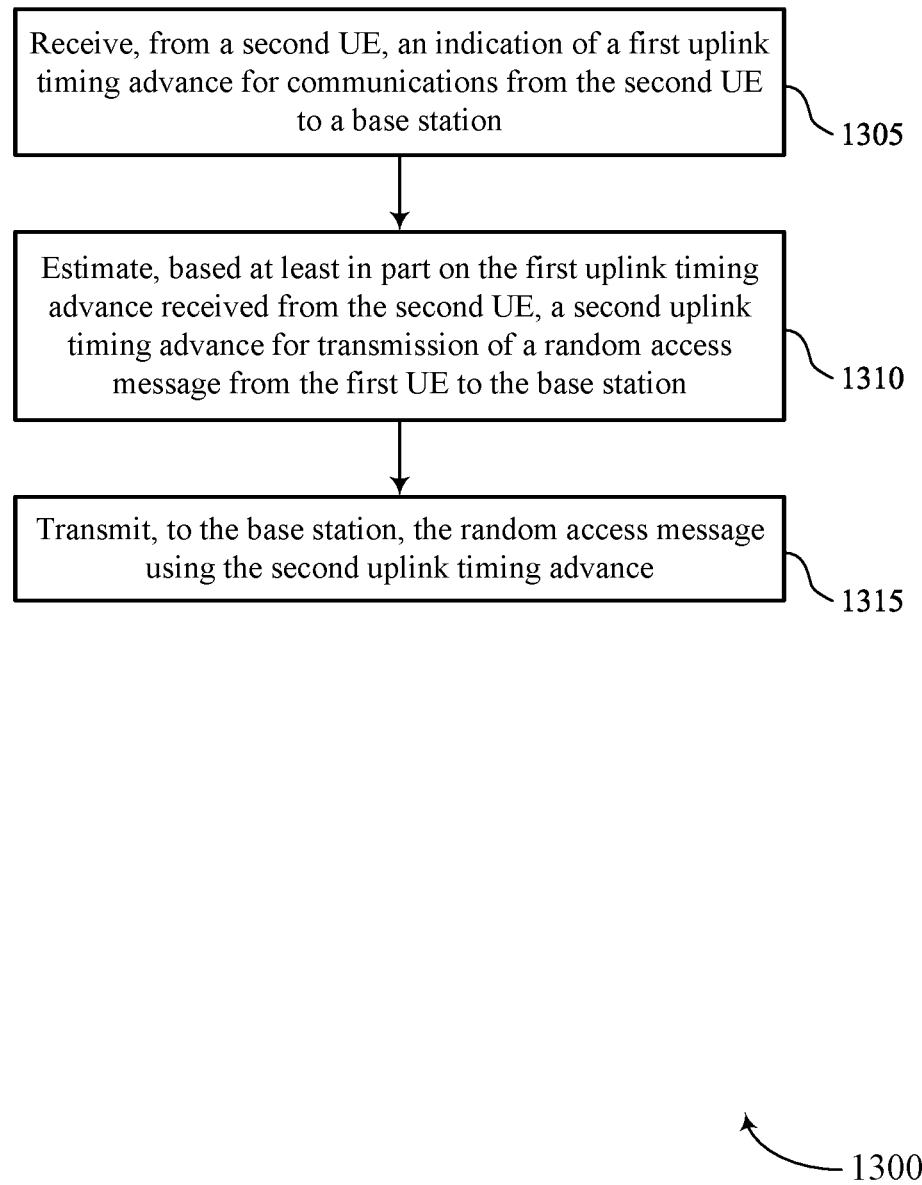
FIGS. 13 through 17 show flowcharts illustrating methods that support uplink timing advance estimation from sidelink in accordance with aspects of the present disclosure.

FIG. 13 shows a flowchart illustrating a method 1300 that supports uplink timing advance estimation from sidelink in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a second UE, an indication of a first uplink timing advance for communications from the second UE to a base station. The operations of 1305 may be performed in accordance with examples as disclosed herein. In some examples, aspects of the operations of 1305 may be performed by a timing advance indication manager 725 as described with reference to FIG. 7.

At 1310, the method may include estimating, based on the first uplink timing advance received from the second UE, a second uplink timing advance for transmission of a random access message from the first UE to the base station. The operations of 1310 may be performed in accordance with examples as disclosed herein. In some examples, aspects of the operations of 1310 may be performed by a timing advance estimation manager 730 as described with reference to FIG. 7.

At 1315, the method may include transmitting, to the base station, the random access message using the second uplink timing advance. The operations of 1315 may be performed in accordance with examples as disclosed herein. In some examples, aspects of the operations of 1315 may be performed by a RACH manager 735 as described with reference to FIG. 7.

Figure 14:
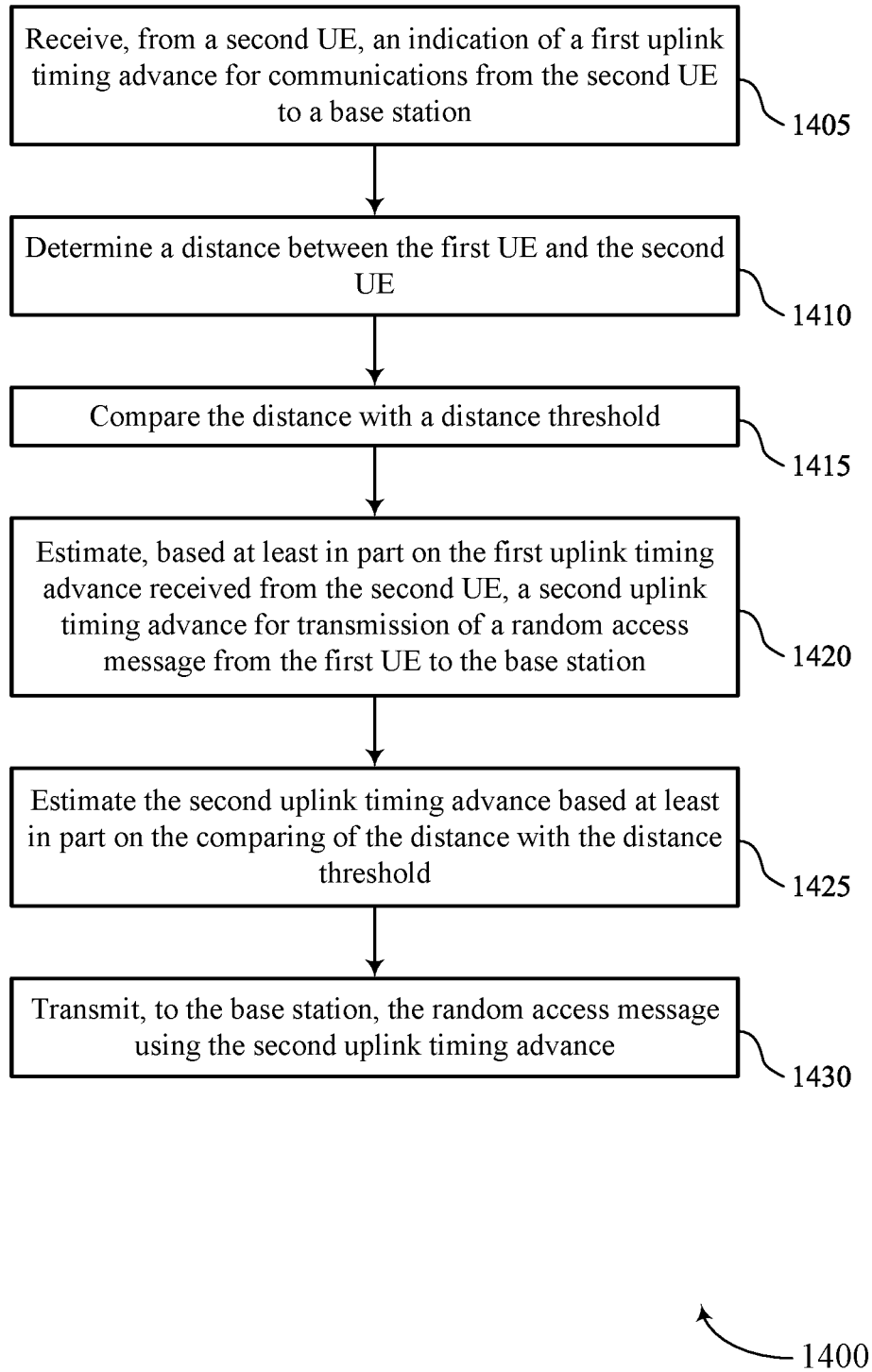

FIG. 14 shows a flowchart illustrating a method 1400 that supports uplink timing advance estimation from sidelink in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a second UE, an indication of a first uplink timing advance for communications from the second UE to a base station. The operations of 1405 may be performed in accordance with examples as disclosed herein. In some examples, aspects of the operations of 1405 may be performed by a timing advance indication manager 725 as described with reference to FIG. 7.

At 1410, the method may include determining a distance between the first UE and the second UE. The operations of 1410 may be performed in accordance with examples as disclosed herein. In some examples, aspects of the operations of 1410 may be performed by a distance manager 740 as described with reference to FIG. 7.

At 1415, the method may include comparing the distance with a distance threshold. The operations of 1415 may be performed in accordance with examples as disclosed herein. In some examples, aspects of the operations of 1415 may be performed by a distance manager 740 as described with reference to FIG. 7.

At 1420, the method may include estimating, based on the first uplink timing advance received from the second UE, a second uplink timing advance for transmission of a random access message from the first UE to the base station. The operations of 1420 may be performed in accordance with examples as disclosed herein. In some examples, aspects of the operations of 1420 may be performed by a timing advance estimation manager 730 as described with reference to FIG. 7.

At 1425, the method may include estimating the second uplink timing advance based on the comparing of the distance with the distance threshold. The operations of 1425 may be performed in accordance with examples as disclosed herein. In some examples, aspects of the operations of 1425 may be performed by a distance manager 740 as described with reference to FIG. 7.

At 1430, the method may include transmitting, to the base station, the random access message using the second uplink timing advance. The operations of 1430 may be performed in accordance with examples as disclosed herein. In some examples, aspects of the operations of 1430 may be performed by a RACH manager 735 as described with reference to FIG. 7.

Figure 15:
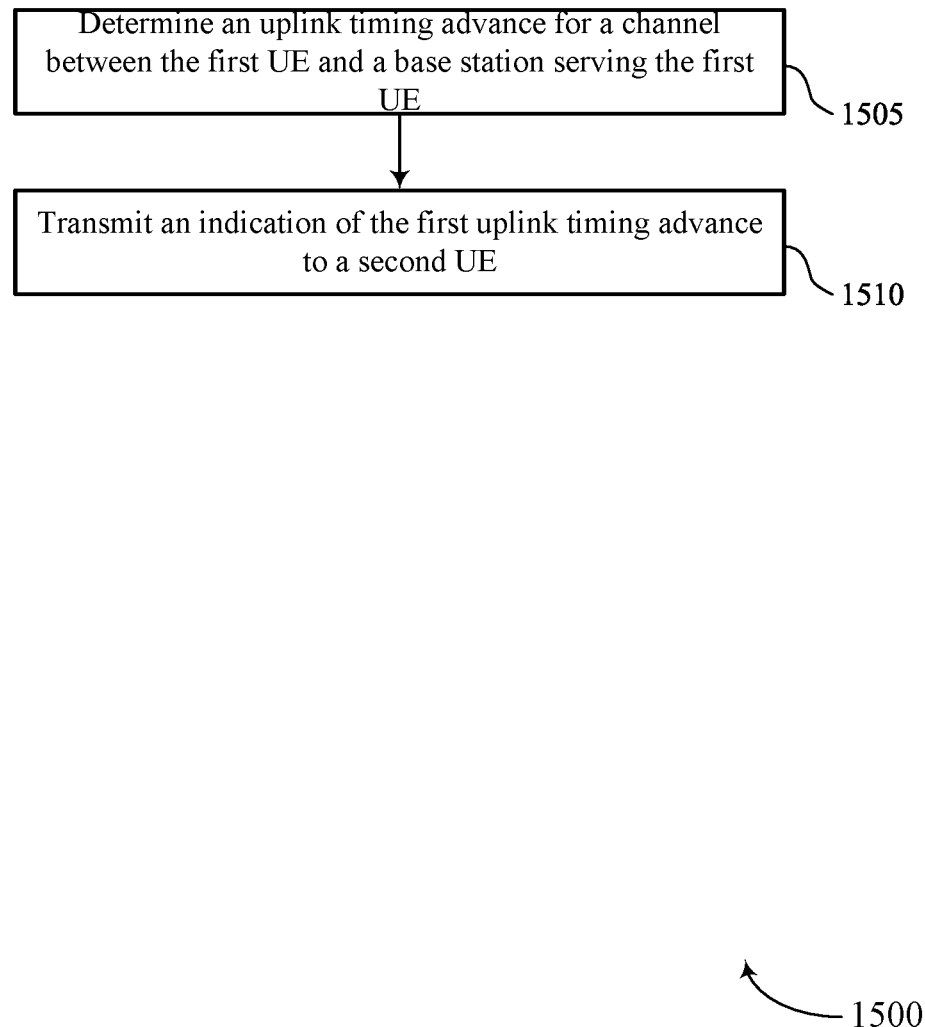

FIG. 15 shows a flowchart illustrating a method 1500 that supports uplink timing advance estimation from sidelink in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include determining an uplink timing advance for a channel between the first UE and a base station serving the first UE. The operations of 1505 may be performed in accordance with examples as disclosed herein. In some examples, aspects of the operations of 1505 may be performed by a timing advance indication manager 725 as described with reference to FIG. 7.

At 1510, the method may include transmitting an indication of the first uplink timing advance to a second UE. The operations of 1510 may be performed in accordance with examples as disclosed herein. In some examples, aspects of the operations of 1510 may be performed by a timing advance indication manager 725 as described with reference to FIG. 7.

Figure 16:
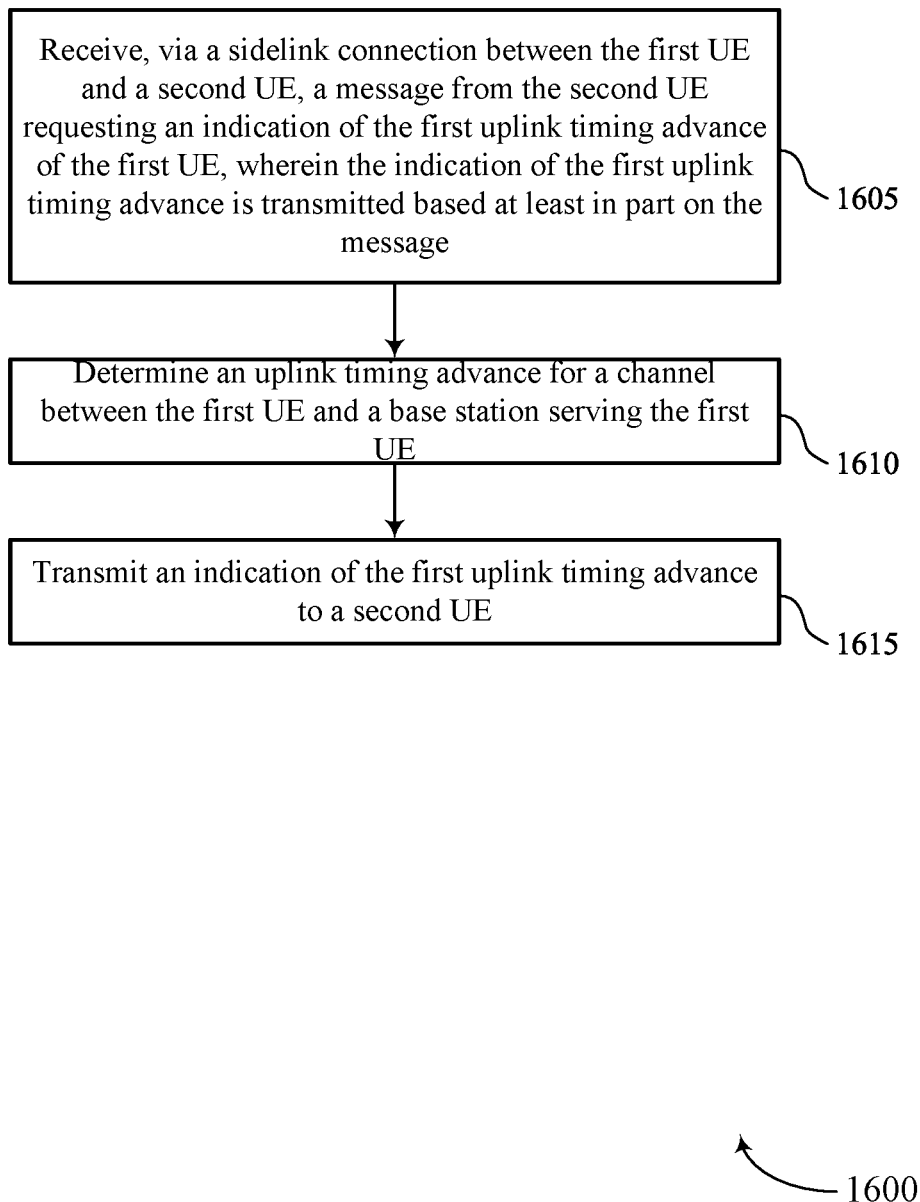

FIG. 16 shows a flowchart illustrating a method 1600 that supports uplink timing advance estimation from sidelink in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving, via a sidelink connection between the first UE and a second UE, a message from the second UE requesting an indication of the first uplink timing advance of the first UE, where the indication of the first uplink timing advance is transmitted based on the message. The operations of 1605 may be performed in accordance with examples as disclosed herein. In some examples, aspects of the operations of 1605 may be performed by an uplink timing request manager 750 as described with reference to FIG. 7.

At 1610, the method may include determining an uplink timing advance for a channel between the first UE and a base station serving the first UE. The operations of 1610 may be performed in accordance with examples as disclosed herein. In some examples, aspects of the operations of 1610 may be performed by a timing advance indication manager 725 as described with reference to FIG. 7.

At 1615, the method may include transmitting an indication of the first uplink timing advance to a second UE. The operations of 1615 may be performed in accordance with examples as disclosed herein. In some examples, aspects of the operations of 1615 may be performed by a timing advance indication manager 725 as described with reference to FIG. 7.

Figure 17:
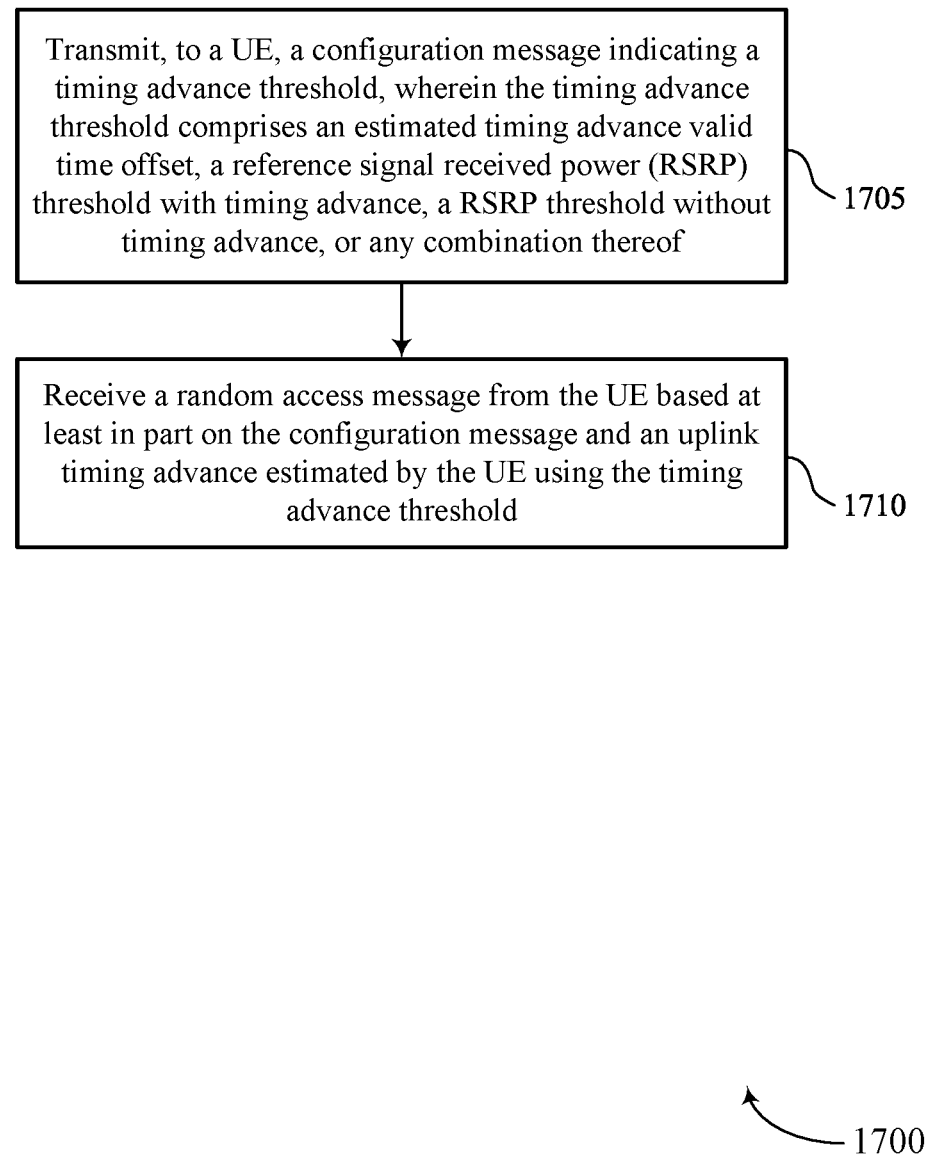

FIG. 17 shows a flowchart illustrating a method 1700 that supports uplink timing advance estimation from sidelink in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, a configuration message indicating a timing advance threshold, where the timing advance threshold includes an estimated timing advance valid time offset, a RSRP threshold with timing advance, a RSRP threshold without timing advance, or any combination thereof. The operations of 1705 may be performed in accordance with examples as disclosed herein. In some examples, aspects of the operations of 1705 may be performed by a timing advance threshold manager 1125 as described with reference to FIG. 11.

At 1710, the method may include receiving a random access message from the UE based on the configuration message and an uplink timing advance estimated by the UE using the timing advance threshold. The operations of 1710 may be performed in accordance with examples as disclosed herein. In some examples, aspects of the operations of 1710 may be performed by a RACH manager 1130 as described with reference to FIG. 11.

The following provides an overview of aspects of the present disclosure:

Aspect 1: A method for wireless communication at a first UE, comprising: receiving, from a second UE, an indication of a first uplink timing advance for communications from the second UE to a base station; estimating, based at least in part on the first uplink timing advance received from the second UE, a second uplink timing advance for transmission of a random access message from the first UE to the base station; and transmitting, to the base station, the random access message using the second uplink timing advance.

Aspect 2: The method of aspect 1, wherein estimating the second uplink timing advance further comprises: determining a distance between the first UE and the second UE; comparing the distance with a distance threshold; and estimating the second uplink timing advance based at least in part on the comparing of the distance with the distance threshold.

Aspect 3: The method of aspect 2, wherein determining the distance comprises: receiving an indication of the distance threshold from the base station, the second UE, or both.

Aspect 4: The method of aspect 3, further comprising: adjusting the distance threshold based at least in part on the first uplink timing advance.

Aspect 5: The method of any of aspects 3 through 4, further comprising: adjusting the distance threshold based at least in part on a comparison of a first receive beam of the first UE and a second receive beam of the second UE, wherein the first receive beam and the second receive beam are used by the first UE and the second UE, respectively, for receiving synchronization signal blocks from the base station.

Aspect 6: The method of any of aspects 2 through 5, wherein determining the distance comprises: performing a ranging procedure for the second UE based at least in part on a sidelink connection between the first UE and the second UE.

Aspect 7: The method of any of aspects 1 through 6, further comprising: selecting between a four-step random access procedure and a two-step random access procedure based at least in part on a comparison of the second uplink timing advance with a timing advance threshold, where in the random access message is a first uplink random access message in either the four-step random access procedure or the two-step random access procedure.

Aspect 8: The method of aspect 7, further comprising: receiving an RRC configuration message from the base station indicating the timing advance threshold, wherein the timing advance threshold comprises an estimated timing advance valid time offset, a RSRP threshold with timing advance, a RSRP threshold without timing advance, or any combination thereof.

Aspect 9: The method of aspect 8, further comprising: comparing an estimation time for the second uplink timing advance to a transmit time of the random access message according to the estimated timing advance valid time offset; and selecting the two-step random access procedure based at least in part on the estimation time for the second uplink timing advance being within the estimated timing advance time offset.

Aspect 10: The method of aspect 9, further comprising: selecting the two-step random access procedure based at least in part on comparing a measured RSRP value for a channel between the first UE and the base station to the RSRP threshold with timing advance.

Aspect 11: The method of any of aspects 1 through 10, further comprising: transmitting, via a sidelink connection between the first UE and the second UE, a message to the second UE requesting the indication of the first uplink timing advance, wherein the indication of the first uplink timing advance is received based at least in part on the message.

Aspect 12: The method of aspect 11, wherein the message comprises a sidelink MAC-CE message, a sidelink RRC message, or any combination thereof.

Aspect 13: The method of any of aspects 1 through 12, wherein the indication of the first uplink timing advance is received via a sidelink MAC-CE message, a sidelink RRC message, or any combination thereof.

Aspect 14: The method of any of aspects 1 through 13, wherein the second uplink timing advance is the same as the first uplink timing advance.

Aspect 15: A method for wireless communication at a first UE, comprising: determining an uplink timing advance for a channel between the first UE and a base station serving the first UE; and transmitting an indication of the first uplink timing advance to a second UE.

Aspect 16: The method of aspect 15, further comprising: receiving, via a sidelink connection between the first UE and a second UE, a message from the second UE requesting an indication of the first uplink timing advance of the first UE, wherein the indication of the first uplink timing advance is transmitted based at least in part on the message.

Aspect 17: The method of any of aspects 15 through 16, further comprising: broadcasting the indication of the first uplink timing advance via a sidelink connection between the first UE and the second UE.

Aspect 18: The method of any of aspects 15 through 17, further comprising: determining a location of the first UE; and transmitting an indication of the location of the first UE to the second UE.

Aspect 19: A method for wireless communication at a base station, comprising: transmitting, to a UE, a configuration message indicating a timing advance threshold, wherein the timing advance threshold comprises an estimated timing advance valid time offset, a RSRP threshold with timing advance, a RSRP threshold without timing advance, or any combination thereof; and receiving a random access message from the UE based at least in part on the configuration message and an uplink timing advance estimated by the UE using the timing advance threshold.

Aspect 20: The method of aspect 19, further comprising: transmitting an indication to the UE enabling uplink timing advance estimation by the UE.

Aspect 21: An apparatus for wireless communication at a first UE, comprising a processor; memory coupled with the processor; and instructions stored in the memory and executable by the processor to cause the apparatus to perform a method of any of aspects 1 through 14.

Aspect 22: An apparatus for wireless communication at a first UE, comprising at least one means for performing a method of any of aspects 1 through 14.

Aspect 23: A non-transitory computer-readable medium storing code for wireless communication at a first UE, the code comprising instructions executable by a processor to perform a method of any of aspects 1 through 14.

Aspect 24: An apparatus for wireless communication at a first UE, comprising a processor; memory coupled with the processor; and instructions stored in the memory and executable by the processor to cause the apparatus to perform a method of any of aspects 15 through 18.

Aspect 25: An apparatus for wireless communication at a first UE, comprising at least one means for performing a method of any of aspects 15 through 18.

Aspect 26: A non-transitory computer-readable medium storing code for wireless communication at a first UE, the code comprising instructions executable by a processor to perform a method of any of aspects 15 through 18.

Aspect 27: An apparatus for wireless communication at a base station, comprising a processor; memory coupled with the processor; and instructions stored in the memory and executable by the processor to cause the apparatus to perform a method of any of aspects 19 through 20.

Aspect 28: An apparatus for wireless communication at a base station, comprising at least one means for performing a method of any of aspects 19 through 20.

Aspect 29: A non-transitory computer-readable medium storing code for wireless communication at a base station, the code comprising instructions executable by a processor to perform a method of any of aspects 19 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   receiving, via a sidelink connection between the first UE and a second UE, an indication of a first uplink timing advance from the second UE, wherein the first uplink timing advance is for communications from the second UE to a base station;
   estimating, based at least in part on the first uplink timing advance received from the second UE, a second uplink timing advance for transmission of a random access message from the first UE to the base station; and
   transmitting, to the base station, the random access message using the second uplink timing advance.

2. The method of claim 1, wherein estimating the second uplink timing advance further comprises:
   determining a distance between the first UE and the second UE;
   comparing the distance with a distance threshold; and
   estimating the second uplink timing advance based at least in part on the comparing of the distance with the distance threshold.

3. The method of claim 2, wherein determining the distance comprises:
   receiving an indication of the distance threshold from the base station, the second UE, or both.

4. The method of claim 3, further comprising:
   adjusting the distance threshold based at least in part on the first uplink timing advance.

5. The method of claim 3, further comprising:
   adjusting the distance threshold based at least in part on a comparison of a first receive beam of the first UE and a second receive beam of the second UE, wherein the first receive beam and the second receive beam are used by the first UE and the second UE, respectively, for receiving synchronization signal blocks from the base station.

6. The method of claim 2, wherein determining the distance comprises:
   performing a ranging procedure for the second UE based at least in part on a sidelink connection between the first UE and the second UE.

7. The method of claim 1, further comprising:
   selecting between a four-step random access procedure and a two-step random access procedure based at least in part on a comparison of the second uplink timing advance with a timing advance threshold, where in the random access message is a first uplink random access message in either the four-step random access procedure or the two-step random access procedure.

8. The method of claim 7, further comprising:
   receiving a radio resource control (RRC) configuration message from the base station indicating the timing advance threshold, wherein the timing advance threshold comprises an estimated timing advance valid time offset, a reference signal received power (RSRP) threshold with timing advance, a RSRP threshold without timing advance, or any combination thereof.

9. The method of claim 8, further comprising:
   comparing an estimation time for the second uplink timing advance to a transmit time of the random access message according to the estimated timing advance valid time offset; and
   selecting the two-step random access procedure based at least in part on the estimation time for the second uplink timing advance being within the estimated timing advance time offset.

10. The method of claim 9, further comprising:
    selecting the two-step random access procedure based at least in part on comparing a measured RSRP value for a channel between the first UE and the base station to the RSRP threshold with timing advance.

11. The method of claim 1, further comprising:
    transmitting, via the sidelink connection between the first UE and the second UE, a message to the second UE requesting the indication of the first uplink timing advance, wherein the indication of the first uplink timing advance is received based at least in part on the message.

12. The method of claim 11, wherein the message comprises a sidelink medium access control-control element (MAC-CE) message, a sidelink radio resource control (RRC) message, or any combination thereof.

13. The method of claim 1, wherein the indication of the first uplink timing advance is received via a sidelink medium access control-control element (MAC-CE) message, a sidelink radio resource control (RRC) message, or any combination thereof.

14. The method of claim 1, wherein the second uplink timing advance is a same timing advance as the first uplink timing advance.

15. A method for wireless communication at a first UE, comprising:
receiving, via a sidelink connection between the first UE and a second UE, a message from the second UE requesting an indication of a first uplink timing advance of the first UE;
determining the uplink timing advance for a channel between the first UE and a base station serving the first UE; and
transmitting, via the sidelink connection between the first UE and the second UE, an indication of the first uplink timing advance to the second UE, wherein the indication of the first uplink timing advance is transmitted based at least in part on the message.

16. The method of claim 15, further comprising:
broadcasting the indication of the first uplink timing advance via the sidelink connection between the first UE and the second UE.

17. The method of claim 15, further comprising:
determining a location of the first UE; and
transmitting an indication of the location of the first UE to the second UE.

18. An apparatus for wireless communication at a first user equipment (UE), comprising:
one or more processors;
one or more memories coupled with the one or more processors; and
instructions stored in the one or more memories and executable by the one or more processors to cause the apparatus to:
receive, via a sidelink connection between the first UE and a second UE, an indication of a first uplink timing advance from the second UE, wherein the first uplink timing advance is for communications from the second UE to a base station;
estimate, based at least in part on the first uplink timing advance received from the second UE, a second uplink timing advance for transmission of a random access message from the first UE to the base station; and
transmit, to the base station, the random access message using the second uplink timing advance.

19. The apparatus of claim 18, wherein the instructions to estimate the second uplink timing advance are further executable by the one or more processors to cause the apparatus to:
determine a distance between the first UE and the second UE;
compare the distance with a distance threshold; and
estimate the second uplink timing advance based at least in part on the comparing of the distance with the distance threshold.

20. The apparatus of claim 19, wherein the instructions to determine the distance are executable by the one or more processors to cause the apparatus to:
receive an indication of the distance threshold from the base station, the second UE, or both.

21. The apparatus of claim 20, wherein the instructions are further executable by the one or more processors to cause the apparatus to:
adjust the distance threshold based at least in part on the first uplink timing advance.

22. The apparatus of claim 20, wherein the instructions are further executable by the one or more processors to cause the apparatus to:
adjust the distance threshold based at least in part on a comparison of a first receive beam of the first UE and a second receive beam of the second UE, wherein the first receive beam and the second receive beam are used by the first UE and the second UE, respectively, for receiving synchronization signal blocks from the base station.

23. The apparatus of claim 19, wherein the instructions to determine the distance are executable by the one or more processors to cause the apparatus to:
perform a ranging procedure for the second UE based at least in part on a sidelink connection between the first UE and the second UE.

24. The apparatus of claim 18, wherein the instructions are further executable by the one or more processors to cause the apparatus to:
select between a four-step random access procedure and a two-step random access procedure based at least in part on a comparison of the second uplink timing advance with a timing advance threshold, where in the random access message is a first uplink random access message in either the four-step random access procedure or the two-step random access procedure.

25. The apparatus of claim 24, wherein the instructions are further executable by the one or more processors to cause the apparatus to:
receive a radio resource control (RRC) configuration message from the base station indicating the timing advance threshold, wherein the timing advance threshold comprises an estimated timing advance valid time offset, a reference signal received power (RSRP) threshold with timing advance, a RSRP threshold without timing advance, or any combination thereof.

26. The apparatus of claim 25, wherein the instructions are further executable by the one or more processors to cause the apparatus to:
compare an estimation time for the second uplink timing advance to a transmit time of the random access message according to the estimated timing advance valid time offset; and
select the two-step random access procedure based at least in part on the estimation time for the second uplink timing advance being within the estimated timing advance time offset.

27. The apparatus of claim 26, wherein the instructions are further executable by the one or more processors to cause the apparatus to:
select the two-step random access procedure based at least in part on comparing a measured RSRP value for a channel between the first UE and the base station to the RSRP threshold with timing advance.

28. An apparatus for wireless communication at a first UE, comprising:
one or more processors;
one or more memories coupled with the one or more processors; and
instructions stored in the one or more memories and executable by the one or more processors to cause the apparatus to:

receive, via a sidelink connection between the first UE and a second UE, a message from the second UE requesting an indication of a first uplink timing advance of the first UE;

determine the first uplink timing advance for a channel between the first UE and a base station serving the first UE; and transmit, via the sidelink connection between the first UE and the second UE, the indication of the first uplink timing advance to the second UE, wherein the indication of the first uplink timing advance is transmitted based at least in part on the message.

* * * * *